(12) United States Patent
Lawson

(10) Patent No.: US 11,544,752 B2
(45) Date of Patent: Jan. 3, 2023

(54) SYSTEM AND METHOD FOR A MEDIA INTELLIGENCE PLATFORM

(71) Applicant: Twilio Inc., San Francisco, CA (US)

(72) Inventor: Jeffrey Lawson, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 252 days.

(21) Appl. No.: 17/077,528

(22) Filed: Oct. 22, 2020

(65) Prior Publication Data

US 2021/0082010 A1    Mar. 18, 2021

Related U.S. Application Data

(63) Continuation of application No. 16/570,531, filed on Sep. 13, 2019, now Pat. No. 10,853,854, which is a (Continued)

(51) Int. Cl.
*G06F 15/173* (2006.01)
*G06Q 30/04* (2012.01)
(Continued)

(52) U.S. Cl.
CPC ......... *G06Q 30/04* (2013.01); *H04L 12/1403* (2013.01); *H04L 41/147* (2013.01);
(Continued)

(58) Field of Classification Search
CPC . H04L 29/06176; H04L 43/50; H04L 67/104; G06Q 30/04
See application file for complete search history.

(56) References Cited

U.S. PATENT DOCUMENTS

| 5,274,700 A | 12/1993 | Gechter et al. |
| 5,526,416 A | 6/1996 | Dezonno et al. |
| (Continued) | | |

FOREIGN PATENT DOCUMENTS

| DE | 1684587 A1 | 3/1971 |
| EP | 0282126 A2 | 9/1988 |
| (Continued) | | |

OTHER PUBLICATIONS

"Aepona's API Monetization Platform Wins Best of 4G Awards for Mobile Cloud Enabler", 4G World 2012 Conference & Expo, [Online]. [Accessed Nov. 5, 2015]. Retrieved from the Internet: <URL: https://www.realwire.com/releases/%20Aeponas-API-Monetization>, (Oct. 30, 2012), 4 pgs.
(Continued)

*Primary Examiner* — Arvin Eskandarnia
(74) *Attorney, Agent, or Firm* — Schwegman Lundberg & Woessner, P.A.

(57) ABSTRACT

A multi-tenant media processing platform system and method. At least a first media analysis service of a plurality of media analysis services is activated for at least a portion of an active communication session of an entity in the platform system. The first activated media analysis service performs a first media analysis on media of the active communication session that is collected by the platform system. The first activated media analysis service performs the first media analysis on the collected media while the communication session is active to generate a first media analysis result. During the active communication session, at least one media analysis result is applied.

20 Claims, 10 Drawing Sheets

Related U.S. Application Data continuation of application No. 15/708,845, filed on Sep. 19, 2017, now Pat. No. 10,467,665, which is a continuation of application No. 15/262,220, filed on Sep. 12, 2016, now Pat. No. 9,805,399, which is a continuation of application No. 15/013,292, filed on Feb. 2, 2016, now Pat. No. 9,477,975.

(60) Provisional application No. 62/111,399, filed on Feb. 3, 2015.

(51) Int. Cl.
| | | |
|---|---|---|
| *H04L 43/50* | (2022.01) | |
| *H04L 67/104* | (2022.01) | |
| *H04L 41/147* | (2022.01) | |
| *H04M 15/00* | (2006.01) | |
| *H04W 4/24* | (2018.01) | |
| *H04L 12/14* | (2006.01) | |

(52) U.S. Cl.
CPC ............ *H04L 43/50* (2013.01); *H04L 67/104* (2013.01); *H04M 15/41* (2013.01); *H04M 15/765* (2013.01); *H04M 15/7652* (2013.01); *H04M 15/7655* (2013.01); *H04M 15/8228* (2013.01); *H04W 4/24* (2013.01); *H04M 15/8066* (2013.01)

(56) References Cited

U.S. PATENT DOCUMENTS

| | | | |
|---|---|---|---|
| 5,581,608 A | 12/1996 | Jreij et al. | |
| 5,598,457 A | 1/1997 | Foladare et al. | |
| 5,867,495 A | 2/1999 | Elliott et al. | |
| 5,934,181 A | 8/1999 | Adamczewski | |
| 5,978,465 A | 11/1999 | Corduroy et al. | |
| 6,026,440 A | 2/2000 | Shrader et al. | |
| 6,034,946 A | 3/2000 | Roginsky et al. | |
| 6,094,681 A | 7/2000 | Shaffer et al. | |
| 6,138,143 A | 10/2000 | Gigliotti et al. | |
| 6,185,565 B1 | 2/2001 | Meubus et al. | |
| 6,192,123 B1 | 2/2001 | Grunsted et al. | |
| 6,206,564 B1 | 3/2001 | Adamczewski | |
| 6,223,287 B1 | 4/2001 | Douglas et al. | |
| 6,232,979 B1 | 5/2001 | Shochet | |
| 6,269,336 B1 | 7/2001 | Ladd et al. | |
| 6,317,137 B1 | 11/2001 | Rosasco | |
| 6,363,065 B1 | 3/2002 | Thornton et al. | |
| 6,373,836 B1 | 4/2002 | Deryugin et al. | |
| 6,425,012 B1 | 7/2002 | Trovato et al. | |
| 6,426,995 B1 | 7/2002 | Kim et al. | |
| 6,430,175 B1 | 8/2002 | Echols et al. | |
| 6,434,528 B1 | 8/2002 | Sanders | |
| 6,445,694 B1 | 9/2002 | Swartz | |
| 6,445,776 B1 | 9/2002 | Shank et al. | |
| 6,459,913 B2 | 10/2002 | Cloutier | |
| 6,463,414 B1 | 10/2002 | Su et al. | |
| 6,493,558 B1 | 12/2002 | Bernhart et al. | |
| 6,496,500 B2 | 12/2002 | Nance et al. | |
| 6,501,739 B1 | 12/2002 | Cohen | |
| 6,501,832 B1 | 12/2002 | Saylor et al. | |
| 6,507,875 B1 | 1/2003 | Mellen-Garnett et al. | |
| 6,571,245 B2 * | 5/2003 | Huang .............. G06F 17/30867 | |
| 6,574,216 B1 | 6/2003 | Farris et al. | |
| 6,577,721 B1 | 6/2003 | Vainio et al. | |
| 6,600,736 B1 | 7/2003 | Ball et al. | |
| 6,606,596 B1 | 8/2003 | Zirngibl et al. | |
| 6,614,783 B1 | 9/2003 | Sonesh et al. | |
| 6,625,258 B1 | 9/2003 | Ram et al. | |
| 6,625,576 B2 | 9/2003 | Kochanski et al. | |
| 6,636,504 B1 | 10/2003 | Albers et al. | |
| 6,662,231 B1 | 12/2003 | Drosset et al. | |
| 6,704,785 B1 | 3/2004 | Koo et al. | |
| 6,707,889 B1 | 3/2004 | Saylor et al. | |
| 6,711,129 B1 | 3/2004 | Bauer et al. | |
| 6,711,249 B2 | 3/2004 | Weissman et al. | |
| 6,738,738 B2 | 5/2004 | Henton | |
| 6,757,365 B1 | 6/2004 | Bogard | |
| 6,765,997 B1 | 7/2004 | Zirngibl et al. | |
| 6,768,788 B1 | 7/2004 | Langseth et al. | |
| 6,771,955 B2 | 8/2004 | Imura et al. | |
| 6,778,653 B1 | 8/2004 | Kallas et al. | |
| 6,785,266 B2 | 8/2004 | Swartz | |
| 6,788,768 B1 | 9/2004 | Saylor et al. | |
| 6,792,086 B1 | 9/2004 | Saylor et al. | |
| 6,792,093 B2 | 9/2004 | Barak et al. | |
| 6,798,867 B1 | 9/2004 | Zirngibl et al. | |
| 6,807,529 B2 | 10/2004 | Johnson et al. | |
| 6,807,574 B1 | 10/2004 | Partovi et al. | |
| 6,819,667 B1 | 11/2004 | Brusilovsky et al. | |
| 6,820,260 B1 | 11/2004 | Flockhart et al. | |
| 6,829,334 B1 | 12/2004 | Zirngibl et al. | |
| 6,831,966 B1 | 12/2004 | Tegan et al. | |
| 6,834,265 B2 | 12/2004 | Balasuriya | |
| 6,836,537 B1 | 12/2004 | Zirngibl et al. | |
| 6,842,767 B1 | 1/2005 | Partovi et al. | |
| 6,850,603 B1 | 2/2005 | Eberle et al. | |
| 6,870,830 B1 | 3/2005 | Schuster et al. | |
| 6,873,952 B1 | 3/2005 | Bailey et al. | |
| 6,874,084 B1 | 3/2005 | Dobner et al. | |
| 6,885,737 B1 | 4/2005 | Gao et al. | |
| 6,888,929 B1 | 5/2005 | Saylor et al. | |
| 6,895,084 B1 | 5/2005 | Saylor et al. | |
| 6,898,567 B2 | 5/2005 | Balasuriya | |
| 6,912,581 B2 | 6/2005 | Johnson et al. | |
| 6,922,411 B1 | 7/2005 | Taylor | |
| 6,928,469 B1 * | 8/2005 | Duursma .................. G06F 9/54 | |
| | | | 709/203 |
| 6,931,405 B2 | 8/2005 | El-shimi et al. | |
| 6,937,699 B1 | 8/2005 | Schuster et al. | |
| 6,940,953 B1 | 9/2005 | Eberle et al. | |
| 6,941,268 B2 | 9/2005 | Porter et al. | |
| 6,947,417 B2 | 9/2005 | Laursen et al. | |
| 6,947,988 B1 | 9/2005 | Saleh et al. | |
| 6,961,330 B1 | 11/2005 | Cattan et al. | |
| 6,964,012 B1 | 11/2005 | Zirngibl et al. | |
| 6,970,915 B1 | 11/2005 | Partovi et al. | |
| 6,977,992 B2 | 12/2005 | Zirngibl et al. | |
| 6,981,041 B2 | 12/2005 | Araujo et al. | |
| 6,985,862 B2 | 1/2006 | Strom et al. | |
| 6,999,576 B2 | 2/2006 | Sacra | |
| 7,003,464 B2 | 2/2006 | Ferrans et al. | |
| 7,006,606 B1 | 2/2006 | Cohen et al. | |
| 7,010,586 B1 | 3/2006 | Allavarpu et al. | |
| 7,020,685 B1 | 3/2006 | Chen et al. | |
| 7,039,165 B1 | 5/2006 | Saylor et al. | |
| 7,058,042 B2 | 6/2006 | Bontempi et al. | |
| 7,058,181 B2 | 6/2006 | Wright et al. | |
| 7,062,709 B2 | 6/2006 | Cheung | |
| 7,065,637 B1 * | 6/2006 | Nanja .................. H04L 63/0272 | |
| | | | 713/1 |
| 7,076,037 B1 | 7/2006 | Gonen et al. | |
| 7,076,428 B2 | 7/2006 | Anastasakos et al. | |
| 7,089,310 B1 | 8/2006 | Ellerman et al. | |
| 7,099,442 B2 | 8/2006 | Da Palma et al. | |
| 7,103,003 B2 | 9/2006 | Brueckheimer et al. | |
| 7,103,171 B1 | 9/2006 | Annadata et al. | |
| 7,106,844 B1 | 9/2006 | Holland | |
| 7,111,163 B1 | 9/2006 | Haney | |
| 7,136,932 B1 | 11/2006 | Schneider | |
| 7,140,004 B1 | 11/2006 | Kunins et al. | |
| 7,143,039 B1 | 11/2006 | Stifelman et al. | |
| 7,197,331 B2 | 3/2007 | Anastasakos et al. | |
| 7,197,461 B1 | 3/2007 | Eberle et al. | |
| 7,197,462 B2 | 3/2007 | Takagi et al. | |
| 7,197,544 B2 | 3/2007 | Wang et al. | |
| D540,074 S | 4/2007 | Peters | |
| 7,225,232 B2 | 5/2007 | Elberse | |
| 7,227,849 B1 | 6/2007 | Rasanen | |
| 7,245,611 B2 | 7/2007 | Narasimhan et al. | |
| 7,260,208 B2 | 8/2007 | Cavalcanti | |
| 7,266,181 B1 | 9/2007 | Zirngibl et al. | |
| 7,269,557 B1 | 9/2007 | Bailey et al. | |

(56) References Cited

U.S. PATENT DOCUMENTS

| | | |
|---|---|---|
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,283,519 B2 | 10/2007 | Girard |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,370,329 B2 | 5/2008 | Kumar et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,496,651 B1 | 2/2009 | Joshi |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,542,761 B2 | 6/2009 | Sarkar |
| 7,552,054 B1 | 6/2009 | Stifelman et al. |
| 7,571,226 B1 | 8/2009 | Partovi et al. |
| 7,606,868 B1 * | 10/2009 | Le .................. G06F 17/30067 |
| | | 707/999.01 |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,275 B2 | 3/2010 | Yajnik et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,685,280 B2 | 3/2010 | Berry et al. |
| 7,685,298 B2 | 3/2010 | Day et al. |
| 7,715,547 B2 | 5/2010 | Ibbotson et al. |
| 7,716,293 B2 | 5/2010 | Kasuga et al. |
| 7,742,499 B1 | 6/2010 | Erskine et al. |
| 7,779,065 B2 | 8/2010 | Gupta et al. |
| 7,809,125 B2 | 10/2010 | Brunson et al. |
| 7,809,791 B2 | 10/2010 | Schwartz et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,929,562 B2 | 4/2011 | Petrovykh |
| 7,936,867 B1 | 5/2011 | Hill et al. |
| 7,949,111 B2 | 5/2011 | Harlow et al. |
| 7,962,644 B1 | 6/2011 | Ezerzer et al. |
| 7,979,555 B2 | 7/2011 | Rothstein et al. |
| 7,992,120 B1 | 8/2011 | Wang et al. |
| 8,023,425 B2 | 9/2011 | Raleigh |
| 8,024,785 B2 | 9/2011 | Andress et al. |
| 8,045,689 B2 | 10/2011 | Provenzale et al. |
| 8,046,378 B1 | 10/2011 | Zhuge et al. |
| 8,046,823 B1 | 10/2011 | Begen et al. |
| 8,069,096 B1 | 11/2011 | Ballaro et al. |
| 8,078,483 B1 | 12/2011 | Hirose et al. |
| 8,081,744 B2 | 12/2011 | Sylvain |
| 8,081,958 B2 | 12/2011 | Soderstrom et al. |
| 8,103,725 B2 | 1/2012 | Gupta et al. |
| 8,126,128 B1 | 2/2012 | Hicks, III et al. |
| 8,126,129 B1 | 2/2012 | Mcguire |
| 8,130,750 B2 | 3/2012 | Hester |
| 8,130,917 B2 | 3/2012 | Helbling et al. |
| 8,139,730 B2 | 3/2012 | Da Palma et al. |
| 8,145,212 B2 | 3/2012 | Lopresti et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,165,116 B2 | 4/2012 | Ku et al. |
| 8,166,185 B2 | 4/2012 | Samuel et al. |
| 8,169,936 B2 | 5/2012 | Koren et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,204,479 B2 | 6/2012 | Vendrow et al. |
| 8,214,868 B2 | 7/2012 | Hamilton et al. |
| 8,218,457 B2 | 7/2012 | Malhotra et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,301,117 B2 | 10/2012 | Keast et al. |
| 8,306,021 B2 | 11/2012 | Lawson et al. |
| 8,315,198 B2 | 11/2012 | Corneille et al. |
| 8,315,369 B2 | 11/2012 | Lawson et al. |
| 8,315,620 B1 | 11/2012 | Williamson et al. |
| 8,319,816 B1 | 11/2012 | Swanson et al. |
| 8,326,805 B1 | 12/2012 | Arous et al. |
| 8,335,852 B2 | 12/2012 | Hokimoto |
| 8,346,630 B1 | 1/2013 | Mckeown |
| 8,355,394 B2 | 1/2013 | Taylor et al. |
| 8,411,669 B2 | 4/2013 | Chen et al. |
| 8,413,247 B2 | 4/2013 | Hudis et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien |
| 8,467,502 B2 | 6/2013 | Sureka et al. |
| 8,477,926 B2 | 7/2013 | Jasper et al. |
| 8,503,639 B2 | 8/2013 | Reding et al. |
| 8,503,650 B2 | 8/2013 | Reding et al. |
| 8,504,818 B2 | 8/2013 | Rao et al. |
| 8,509,068 B2 | 8/2013 | Begall et al. |
| 8,532,686 B2 | 9/2013 | Schmidt et al. |
| 8,533,857 B2 | 9/2013 | Tuchman et al. |
| 8,542,805 B2 | 9/2013 | Agranovsky et al. |
| 8,543,665 B2 | 9/2013 | Ansari et al. |
| 8,547,962 B2 | 10/2013 | Ramachandran et al. |
| 8,549,047 B2 | 10/2013 | Beechuk et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |
| 8,582,737 B2 | 11/2013 | Lawson et al. |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,621,598 B2 | 12/2013 | Lai et al. |
| 8,649,268 B2 | 2/2014 | Lawson et al. |

(56) References Cited

U.S. PATENT DOCUMENTS

| | | | |
|---|---|---|---|
| 8,656,452 B2 | 2/2014 | Li et al. |
| 8,667,056 B1 | 3/2014 | Proulx et al. |
| 8,675,493 B2 | 3/2014 | Buddhikot et al. |
| 8,688,147 B2 | 4/2014 | Nguyen et al. |
| 8,695,077 B1 | 4/2014 | Gerhard et al. |
| 8,713,693 B2 | 4/2014 | Shanabrook et al. |
| 8,728,656 B2 | 5/2014 | Takahashi et al. |
| 8,751,801 B2 | 6/2014 | Harris et al. |
| 8,755,376 B2 | 6/2014 | Lawson et al. |
| 8,767,925 B2 | 7/2014 | Sureka et al. |
| 8,781,975 B2 | 7/2014 | Bennett et al. |
| 8,797,920 B2 | 8/2014 | Parreira |
| 8,806,024 B1 | 8/2014 | Toba Francis et al. |
| 8,819,133 B2 | 8/2014 | Wang |
| 8,825,746 B2 | 9/2014 | Ravichandran et al. |
| 8,837,465 B2 | 9/2014 | Lawson et al. |
| 8,838,707 B2 | 9/2014 | Lawson et al. |
| 8,843,596 B2 | 9/2014 | Goel et al. |
| 8,855,271 B2 | 10/2014 | Brock et al. |
| 8,861,510 B1 | 10/2014 | Fritz |
| 8,879,547 B2 | 11/2014 | Maes |
| 8,903,938 B2 | 12/2014 | Vermeulen et al. |
| 8,918,848 B2 | 12/2014 | Sharma et al. |
| 8,924,489 B2 | 12/2014 | Bleau et al. |
| 8,938,053 B2 | 1/2015 | Cooke et al. |
| 8,948,356 B2 | 2/2015 | Nowack et al. |
| 8,954,591 B2 | 2/2015 | Ganesan et al. |
| 8,964,726 B2 | 2/2015 | Lawson et al. |
| 8,990,610 B2 | 3/2015 | Bostick et al. |
| 9,014,664 B2 | 4/2015 | Kim et al. |
| 9,015,702 B2 | 4/2015 | Bhat |
| 9,031,223 B2 | 5/2015 | Smith et al. |
| 9,032,204 B2 | 5/2015 | Byrd et al. |
| 9,071,677 B2 | 6/2015 | Aggarwal et al. |
| 9,137,127 B2 | 9/2015 | Nowack et al. |
| 9,141,682 B1 | 9/2015 | Adoc, Jr. et al. |
| 9,161,296 B2 | 10/2015 | Parsons et al. |
| 9,177,007 B2 | 11/2015 | Winters et al. |
| 9,204,281 B2 | 12/2015 | Ramprasad et al. |
| 9,210,275 B2 | 12/2015 | Lawson et al. |
| 9,306,982 B2 | 4/2016 | Lawson et al. |
| 9,307,094 B2 | 4/2016 | Nowack et al. |
| 9,325,624 B2 | 4/2016 | Malatack et al. |
| 9,338,190 B2 | 5/2016 | Eng et al. |
| 9,344,573 B2 | 5/2016 | Wolthuis et al. |
| 9,356,916 B2 | 5/2016 | Kravitz et al. |
| 9,378,337 B2 | 6/2016 | Kuhr |
| 9,398,622 B2 | 7/2016 | Lawson et al. |
| 9,456,008 B2 | 9/2016 | Lawson et al. |
| 9,456,339 B1 | 9/2016 | Hildner et al. |
| 9,460,169 B2 | 10/2016 | Hinton et al. |
| 9,477,975 B2 | 10/2016 | Lawson |
| 9,596,274 B2 | 3/2017 | Lawson et al. |
| 9,628,624 B2 | 4/2017 | Wolthuis et al. |
| 9,632,875 B2 | 4/2017 | Raichstein et al. |
| 9,634,995 B2 | 4/2017 | Binder |
| 9,805,399 B2 | 10/2017 | Lawson |
| 10,467,665 B2 | 11/2019 | Lawson |
| 10,853,854 B2 | 12/2020 | Lawson |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0025819 A1 | 2/2002 | Cetusic et al. |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0133587 A1* | 9/2002 | Ensel .................. H04L 12/2602 709/224 |
| 2002/0136391 A1 | 9/2002 | Armstrong et al. |
| 2002/0165957 A1 | 11/2002 | Devoe et al. |
| 2002/0176378 A1 | 11/2002 | Hamilton et al. |
| 2002/0176404 A1 | 11/2002 | Girard |
| 2002/0184361 A1* | 12/2002 | Eden .................... H04L 41/22 709/224 |
| 2002/0198941 A1 | 12/2002 | Gavrilescu et al. |
| 2003/0006137 A1 | 1/2003 | Wei et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097330 A1 | 5/2003 | Hillmer et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0149721 A1 | 8/2003 | Alfonso-nogueiro et al. |
| 2003/0162506 A1 | 8/2003 | Toshimitsu et al. |
| 2003/0195950 A1* | 10/2003 | Huang ............ G06F 17/30867 709/219 |
| 2003/0195990 A1 | 10/2003 | Greenblat et al. |
| 2003/0196076 A1 | 10/2003 | Zabarski et al. |
| 2003/0204616 A1 | 10/2003 | Billhartz et al. |
| 2003/0211842 A1 | 11/2003 | Kempf et al. |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Da Palma et al. |
| 2004/0102182 A1 | 5/2004 | Reith et al. |
| 2004/0117788 A1* | 6/2004 | Karaoguz ........... H04L 12/2803 717/177 |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0199572 A1 | 10/2004 | Hunt et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1* | 10/2004 | Chavers ................ G06F 3/0481 715/810 |
| 2004/0218748 A1 | 11/2004 | Fisher |
| 2004/0228469 A1 | 11/2004 | Andrews et al. |
| 2004/0236696 A1 | 11/2004 | Aoki et al. |
| 2004/0240649 A1 | 12/2004 | Goel |
| 2005/0005109 A1* | 1/2005 | Castaldi ................ G06F 21/606 713/165 |
| 2005/0005200 A1 | 1/2005 | Matenda et al. |
| 2005/0010483 A1 | 1/2005 | Ling |
| 2005/0015505 A1 | 1/2005 | Kruis et al. |
| 2005/0021626 A1 | 1/2005 | Prajapat et al. |
| 2005/0025303 A1 | 2/2005 | Hostetler, Jr. |
| 2005/0038772 A1 | 2/2005 | Colrain |
| 2005/0043952 A1 | 2/2005 | Sharma et al. |
| 2005/0047579 A1 | 3/2005 | Mansour |
| 2005/0060411 A1 | 3/2005 | Coulombe et al. |
| 2005/0083907 A1 | 4/2005 | Fishler |
| 2005/0091336 A1 | 4/2005 | Dehamer et al. |
| 2005/0091572 A1 | 4/2005 | Gavrilescu et al. |
| 2005/0108770 A1* | 5/2005 | Karaoguz ............. H04L 67/327 725/131 |
| 2005/0125251 A1 | 6/2005 | Berger et al. |
| 2005/0125739 A1* | 6/2005 | Thompson ............ G06F 3/0481 715/778 |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |

(56) References Cited

U.S. PATENT DOCUMENTS

| | | |
|---|---|---|
| 2005/0177635 A1 | 8/2005 | Schmidt et al. |
| 2005/0181835 A1 | 8/2005 | Lau et al. |
| 2005/0198292 A1* | 9/2005 | Duursma .............. G06F 9/54 |
| | | 709/225 |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0286496 A1 | 12/2005 | Malhotra et al. |
| 2005/0289222 A1 | 12/2005 | Sahim |
| 2006/0008065 A1 | 1/2006 | Longman et al. |
| 2006/0008073 A1 | 1/2006 | Yoshizawa et al. |
| 2006/0008256 A1* | 1/2006 | Khedouri ........ G06F 17/30038 |
| | | 386/234 |
| 2006/0015467 A1 | 1/2006 | Morken et al. |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0080415 A1 | 4/2006 | Tu |
| 2006/0098624 A1 | 5/2006 | Morgan et al. |
| 2006/0129638 A1 | 6/2006 | Deakin |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168334 A1 | 7/2006 | Potti et al. |
| 2006/0203979 A1 | 9/2006 | Jennings |
| 2006/0209695 A1 | 9/2006 | Archer, Jr. et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0235715 A1 | 10/2006 | Abrams et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0038499 A1 | 2/2007 | Margulies et al. |
| 2007/0043681 A1 | 2/2007 | Morgan et al. |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0107048 A1* | 5/2007 | Halls .................. G06F 21/33 |
| | | 726/4 |
| 2007/0112574 A1 | 5/2007 | Greene |
| 2007/0116191 A1 | 5/2007 | Bermudez et al. |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0120702 A1 | 5/2008 | Hokimoto |
| 2008/0123559 A1 | 5/2008 | Haviv et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1* | 9/2008 | Khedouri ........ G06F 17/30038 |
| | | 386/291 |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0092674 A1 | 4/2009 | Ingram et al. |
| 2009/0093250 A1 | 4/2009 | Jackson et al. |
| 2009/0094674 A1 | 4/2009 | Schwartz et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0216835 A1 | 8/2009 | Jain et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0262725 A1 | 10/2009 | Chen et al. |

(56) References Cited

U.S. PATENT DOCUMENTS

| | | |
|---|---|---|
| 2009/0276771 A1 | 11/2009 | Nickolov et al. |
| 2009/0288012 A1 | 11/2009 | Hertel et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0027531 A1 | 2/2010 | Kurashima |
| 2010/0037204 A1 | 2/2010 | Lin et al. |
| 2010/0054142 A1 | 3/2010 | Moise et al. |
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0107222 A1 | 4/2010 | Glasser |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0281108 A1 | 11/2010 | Cohen |
| 2010/0291910 A1 | 11/2010 | Sanding et al. |
| 2010/0299437 A1 | 11/2010 | Moore |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0138453 A1 | 6/2011 | Verma et al. |
| 2011/0143714 A1 | 6/2011 | Keast et al. |
| 2011/0145049 A1 | 6/2011 | Hertel et al. |
| 2011/0149810 A1 | 6/2011 | Koren et al. |
| 2011/0149950 A1 | 6/2011 | Petit-Huguenin et al. |
| 2011/0151884 A1 | 6/2011 | Zhao |
| 2011/0158235 A1 | 6/2011 | Senga |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0179126 A1 | 7/2011 | Wetherell et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao et al. |
| 2011/0265168 A1 | 10/2011 | Lucovsky et al. |
| 2011/0265172 A1 | 10/2011 | Sharma |
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0289162 A1 | 11/2011 | Furlong et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | Vanswol et al. |
| 2012/0089572 A1 | 4/2012 | Raichstein et al. |
| 2012/0094637 A1 | 4/2012 | Jeyaseelan et al. |
| 2012/0101952 A1 | 4/2012 | Raleigh et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0168488 A1 | 6/2012 | Kaushik et al. |
| 2012/0170726 A1 | 7/2012 | Schwartz |
| 2012/0173610 A1 | 7/2012 | Bleau et al. |
| 2012/0174095 A1 | 7/2012 | Natchadalingam et al. |
| 2012/0179646 A1 | 7/2012 | Hinton et al. |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0185561 A1 | 7/2012 | Klein et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0266258 A1 | 10/2012 | Tuchman et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321058 A1 | 12/2012 | Eng et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0031613 A1 | 1/2013 | Shanabrook et al. |
| 2013/0036476 A1 | 2/2013 | Roever et al. |
| 2013/0047232 A1 | 2/2013 | Tuchman et al. |
| 2013/0054517 A1 | 2/2013 | Beechuk et al. |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0110658 A1 | 5/2013 | Lyman |
| 2013/0132573 A1 | 5/2013 | Lindblom |
| 2013/0139148 A1 | 5/2013 | Berg et al. |
| 2013/0156024 A1 | 6/2013 | Burg |
| 2013/0166580 A1 | 6/2013 | Maharajh et al. |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0268676 A1 | 10/2013 | Martins et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0013400 A1 | 1/2014 | Warshavsky et al. |
| 2014/0025503 A1 | 1/2014 | Meyer et al. |

(56) References Cited

U.S. PATENT DOCUMENTS

| | | |
|---|---|---|
| 2014/0058806 A1 | 2/2014 | Guenette et al. |
| 2014/0064467 A1 | 3/2014 | Lawson et al. |
| 2014/0072115 A1 | 3/2014 | Makagon et al. |
| 2014/0073291 A1 | 3/2014 | Hildner et al. |
| 2014/0095627 A1 | 4/2014 | Romagnino |
| 2014/0101058 A1 | 4/2014 | Castel et al. |
| 2014/0101149 A1 | 4/2014 | Winters et al. |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289391 A1 | 9/2014 | Balaji et al. |
| 2014/0304054 A1 | 10/2014 | Orun et al. |
| 2014/0317640 A1 | 10/2014 | Harm et al. |
| 2014/0355600 A1 | 12/2014 | Lawson et al. |
| 2014/0372508 A1 | 12/2014 | Fausak et al. |
| 2014/0372509 A1 | 12/2014 | Fausak et al. |
| 2014/0372510 A1 | 12/2014 | Fausak et al. |
| 2014/0373098 A1 | 12/2014 | Fausak et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0181631 A1 | 6/2015 | Lee et al. |
| 2015/0236905 A1 | 8/2015 | Bellan et al. |
| 2015/0281294 A1 | 10/2015 | Nur et al. |
| 2015/0365480 A1 | 12/2015 | Soto et al. |
| 2015/0370788 A1 | 12/2015 | Bareket et al. |
| 2015/0381580 A1 | 12/2015 | Graham, III et al. |
| 2016/0001758 A1 | 1/2016 | Sugio |
| 2016/0011758 A1 | 1/2016 | Dornbush et al. |
| 2016/0028695 A1 | 1/2016 | Binder |
| 2016/0077693 A1 | 3/2016 | Meyer et al. |
| 2016/0112475 A1 | 4/2016 | Lawson et al. |
| 2016/0112521 A1 | 4/2016 | Lawson et al. |
| 2016/0119291 A1 | 4/2016 | Zollinger et al. |
| 2016/0127254 A1 | 5/2016 | Kumar et al. |
| 2016/0149956 A1 | 5/2016 | Birnbaum et al. |
| 2016/0162172 A1 | 6/2016 | Rathod |
| 2016/0205519 A1 | 7/2016 | Patel et al. |
| 2016/0225044 A1 | 8/2016 | Lawson |
| 2016/0226937 A1 | 8/2016 | Patel et al. |
| 2016/0226979 A1 | 8/2016 | Lancaster et al. |
| 2016/0234391 A1 | 8/2016 | Wolthuis et al. |
| 2016/0239770 A1 | 8/2016 | Batabyal et al. |
| 2017/0032433 A1 | 2/2017 | Lawson |
| 2017/0339283 A1 | 11/2017 | Chaudhary et al. |
| 2018/0005283 A1 | 1/2018 | Lawson |
| 2020/0143440 A1 | 5/2020 | Lawson |

FOREIGN PATENT DOCUMENTS

| | | |
|---|---|---|
| EP | 1464418 A1 | 10/2004 |
| EP | 1522922 A2 | 4/2005 |
| EP | 1770586 A1 | 4/2007 |
| EP | 2053869 A1 | 4/2009 |
| ES | 2134107 A1 | 9/1999 |
| JP | 10294788 A | 11/1998 |
| JP | 2004166000 A | 6/2004 |
| JP | 2004220118 A | 8/2004 |
| JP | 2006319914 A | 11/2006 |
| WO | WO-9732448 A1 | 9/1997 |
| WO | WO-2002087804 A1 | 11/2002 |
| WO | WO-2006037492 A1 | 4/2006 |
| WO | WO-2009018489 A2 | 2/2009 |
| WO | WO-2009124223 A1 | 10/2009 |
| WO | WO-2010037064 A1 | 4/2010 |
| WO | WO-2010040010 A1 | 4/2010 |
| WO | WO-2010101935 A1 | 9/2010 |
| WO | WO-2011091085 A1 | 7/2011 |

OTHER PUBLICATIONS

"U.S. Appl. No. 15/262,220, Notice of Allowance dated Jul. 11, 2016", 13 pgs.

"U.S. Appl. No. 15/262,220, Non Final Office Action dated Dec. 2, 2016", 8 pgs.

"U.S. Appl. No. 15/262,220, Notice of Allowance dated Mar. 17, 2017", 11 pgs.

"U.S. Appl. No. 15/262,220, Notice of Allowance dated Jun. 19, 2017", 11 pgs.

"U.S. Appl. No. 15/262,220, Response filed Feb. 21, 2017 to Non Final Office Action dated Dec. 2, 2016", 11 pgs.

"U.S. Appl. No. 16/570,531, Notice of Allowance dated Jun. 13, 2019", 13 pgs.

"U.S. Appl. No. 16/570,531, Corrected Notice of Allowability dated Oct. 28, 2020", 7 pgs.

"U.S. Appl. No. 16/570,531, Non Final Office Action dated Jun. 9, 2020", 7 pgs.

"U.S. Appl. No. 16/570,531, Notice of Allowance dated Jul. 23, 2020", 12 pgs.

"U.S. Appl. No. 16/570,531, Preliminary Amendment filed Feb. 18, 2020", 7 pgs.

"U.S. Appl. No. 16/570,531, Response filed Jun. 26, 2020 to Non Final Office Action dated Jun. 9, 2020", 8 pgs.

"Archive Microsoft Office 365 Email I Retain Unified Archiving", GWAVA, Inc., Montreal, Canada, [Online] Retrieved from the Internet: <URL: http://www.gwava.com/Retain/Retain for_Office_365.php>, (2015), 4 pgs.

"Complaint for Patent Infringement", *Telinit Technologies, LLC* v. *Twilio Inc* 2:12-cv-663, (Oct. 12, 2012), 17 pgs.

"Ethernet to Token Ring Bridge", Black Box Corporation, [Online] Retrieved from the Internet: <URL: http://blackboxcanada.com/resource/files/productdetails/17044.pdf>, (Oct. 1999), 2 pgs.

"Twilio Cloud Communications—APIs for Voice, VoIP, and Text Messaging", Twilio, [Online] Retrieved from the Internet: <URL: http://www.twilio.com/docs/api/rest/call-feedback>, (Jun. 24, 2015), 8 pgs.

Abu-Lebdeh, et al., "A 3GPP Evolved Packet Core-Based Architecture for QoS-Enabled Mobile Video Surveillance Applications", 2012 Third International Conference on the Network of the Future {NOF), (Nov. 21-23, 2012), 1-6.

Barakovic, Sabina, et al., "Survey and Challenges of QoE Management Issues in Wireless Networks", Hindawi Publishing Corporation, (2012), 1-29.

Berners-Lee, T., "RFC 3986: Uniform Resource Identifier (URI): Generic Syntax", The Internet Society, [Online], Retrieved from the Internet: <URL: http://tools.ietf.org/html/rfc3986>, (Jan. 2005), 57 pgs.

Kim, Hwa-Jong, et al., "In-Service Feedback QoE Framework", 2010 Third International Conference on Communication Theory. Reliability and Quality of Service, (2010), 135-138.

Matos, et al., "Quality of Experience-based Routing in Multi-Service Wireless Mesh Networks", Realizing Advanced Video Optimized Wireless Networks. IEEE, (2012), 7060-7065.

Mu, Mu, et al., "Quality Evaluation in Peer-to-Peer IPTV Services", Data Traffic and Monitoring Analysis, LNCS 7754, 302-319, (2013), 18 pgs.

Subramanya, et al., "Digital Signatures", IEEE Potentials, (Mar./Apr. 2006), 5-8.

Tran, et al., "User to User adaptive routing based on QoE", ICNS 2011: The Seventh International Conference on Networking and Services, (2011), 170-177.

(56) References Cited

OTHER PUBLICATIONS

U.S. Appl. No. 15/013,292 U.S. Pat. No. 9,477,975, filed Feb. 2, 2016, System and Method for a Media Intelligence Platform.
U.S. Appl. No. 15/262,220 U.S. Pat. No. 9,805,399, filed Sep. 12, 2016, System and Method for a Media Intelligence Platform.
U.S. Appl. No. 15/708,845 U.S. Pat. No. 10,467,665, filed Sep. 19, 2017, System and Method for a Media Intelligence Platform.
U.S. Appl. No. 16/570,531 U.S. Pat. No. 10,853,854, filed Sep. 13, 2019, System and Method for a Media Intelligence Platform.

* cited by examiner

SYSTEM AND METHOD FOR A MEDIA INTELLIGENCE PLATFORM

CROSS-REFERENCE TO RELATED APPLICATIONS

This application is a continuation of U.S. patent application Ser. No. 16/570,531, filed 13 Sep. 2019, which is a continuation of U.S. patent application Ser. No. 15/708,845, filed 19 Sep. 2017, which is a continuation of U.S. patent application Ser. No. 15/262,220, filed 12 Sep. 2016, which is a continuation of U.S. patent application Ser. No. 15/013,292, filed 2 Feb. 2016 which claims the benefit of U.S. Provisional Application Ser. No. 62/111,399, filed on 3 Feb. 2015, which are all incorporated in their entirety by this reference.

TECHNICAL FIELD

This invention relates generally to the communication field, and more specifically to a new and useful system and method for a media intelligence platform in the communication field.

BACKGROUND

There have been many changes in recent years in how people communicate. The rise of mobile devices and VoIP advances have led to numerous services and applications providing news ways for people to communicate. Audio and video processing has similarly seen continued development through the years, bringing several advances as new techniques are discovered and developed. However, it can be challenging from a development standpoint (e.g., technical expertise, time, budget, etc.) to build and maintain a communication service or application that uses advanced media processing techniques. Thus, there is a need in the communication field to create a new and useful system and method for a media intelligence platform. This invention provides such a new and useful system and method.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for a Media Intelligence Platform

Figure 1:
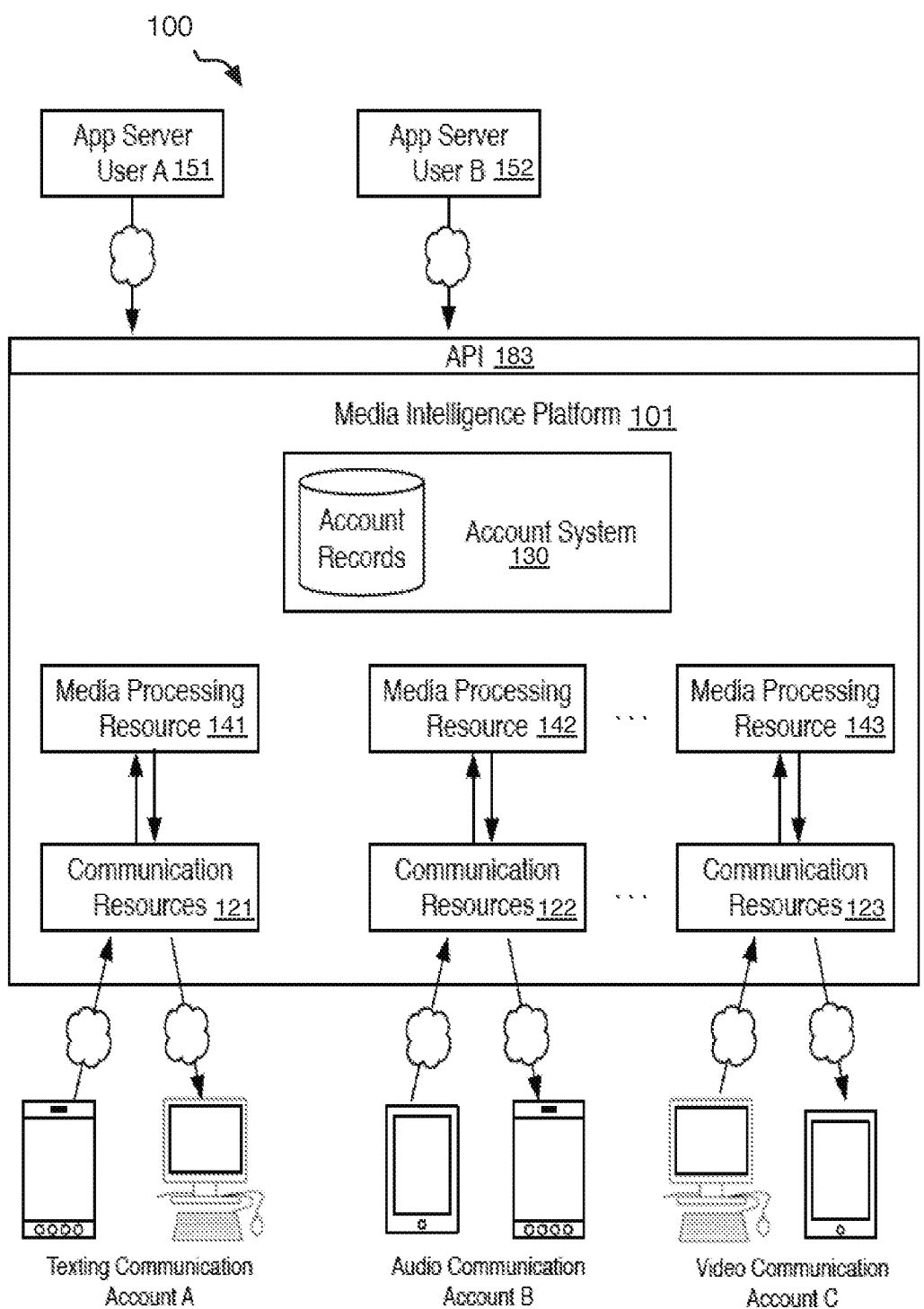
FIG. 1 is a schematic representation of a system of an embodiment.

As shown in FIG. 1, a system 100 for a media intelligence platform of a preferred embodiment includes a multitenant media intelligence platform 101, communication resources 121-123, an API 183, an account configuration system 130, and media processing resources 141-143. The system 100 functions to enable media processing to be offered as a service to outside applications and services (e.g., of the app servers 151 and 152 of FIG. 1). The media processing is preferably used for communication-based applications. The media processing can be offered as a supplemental or complimentary feature to existing communication services (e.g., telephony call flow, call center service, customer-facing communication application, SIP trunking service, etc.). The media processing can alternatively be a stand-alone service, wherein outside communication systems can integrate with the media intelligence platform. The media intelligence platform preferably provides real-time or time-shifted analysis results, which enable communication control logic to utilize information extracted from the media content. The media intelligence platform can additionally or alternatively expose the extracted media intelligence information through communication records available through an API, a browsable user interface, an analytics portal, or any suitable interface.

The system 100 can include various types of media processing resources, which can function to offer a variety of media processing techniques. The media processing techniques may include sentiment and emotion detection, transcription services, language detection, content detection, intent detection, speaker detection, and/or any suitable type of media analysis. The system can similarly be applied to one or more types of media formats.

The media format of a communication can be text, audio, video, multi-media, or any suitable media format. The media can originate in a synchronous session or in an asynchronous message conversation. The media analysis can be performed on all or part of a communication. A communication session is preferably a synchronous media session such as a voice call, a video call, a screen-sharing call, a multi-media call, or any suitable type of media-based call. The portion of a communication can alternatively be one or more asynchronous messages. The messages can be analyzed individually, as a collection, or a time ordered sequence of messages. A message can be a text message, an image, a video, document, or any suitable media message.

The system can additionally include a set of operational services that facilitate operation of the media analysis platform. The operational services preferably include an account system and a metering and logging service.

The account system 130 of the preferred embodiment functions to map requests of the media intelligence platform to an identity within the system. The system is preferably a multitenant platform wherein multiple outside entities can create an account within the platform. An account preferably provides a set of credentials or an alternative authentication mechanism through which requests can be validated. The account system preferably authenticates requests made by an account. In one variation, an account identifier and an authentication token must be included in a request, and these authentication credentials are validated by the account system before the request is fulfilled. An account may be authenticated when making use of a REST API, when receiving signaling communication, during use of a user interface control panel or at any suitable instance.

Various aspects of an account and usage of the platform can be configured through account management interfaces. An account may be managed through an account portal user interface. An account may alternatively be managed through API requests or through any suitable mechanism. Aspects of an account that can be managed include configuring programmatic mechanisms and settings when using the media intelligence. For example, an account manager could set various callback URIs that are triggered during errors or other events in the system. The account manager can further define various parameters that will determine how a communication is routed.

As a related aspect, the system can include a policy engine. The policy engine may be a supplemental component or a sub-component of the account system. Policy can be set per account. Accordingly, different accounts can have different permissions, capabilities, pricing, capacity, performance, or other aspects, which can be set through an account policy. Policy may alternatively be set for a sub-account, for the entire platform, for a geographic region, or for any suitable context. Policy settings may be set by default by the platform but some or all of the policy settings may be driven by an account.

An account can include a defined policy configuration. A policy configuration may set particular limitations for account usage within the platform. The policy can prevent an application of an outside entity incurring usage that is beyond the scope in which the application is meant to be used. For example, a policy configuration may limit the amount of media analyzed or the analysis operations performed.

The account system can additionally include a sub-account mechanism, which functions to enable a user of the platform to partition account usage to enable multitenancy within a product of the account holder. The sub-account mechanism preferably accounts for usage, and more specifically creditable/billable usage to be monitored according to an identifier for a sub-set of usage by an account. For example, an account holder may build an outside application platform that depends on the system. The outside application platform can similarly be multitenant in that multiple users can have individually metered and accounted usage. The inheritable multitenancy property of the platform (i.e., the capability of one account within a multitenant collection of accounts to further subdivide usage the account between subclass of accounts). Can preferably provide the capabilities of a parent account to a subaccount including: billing; programmatic customization, allocation of identifiers or endpoints; and/or other customization. A billing engine can cooperatively facilitate delivering billing statements and collecting payments from the sub-accounts. Additionally, the sub-account mechanism can establish a hierarchy of policy inheritance. A platform preferably contains policies that are applied to account. In one variation, a usage policy is based on the type of account such as free account, basic account, or enterprise-account. A parent account can similarly at least partially define the policies of sub-accounts. In one variation, an account will create sub-account resources.

The metering and logging system of the preferred embodiment functions to create a monitoring system to the media intelligence platform. The metering and logging system operates in coordination with the provided media intelligence platform resources. In one variation, the metering and logging system is integrated within an media processing resource instance running on a machine. In another variation, the metering and logging system can externally monitor the actions of the media processing resources, wherein the actions of a resource may be reported to the metering and logging system in any suitable manner. The metering and logging system functions to create a record of notable activities. The metering can be used in providing programmatic hooks (e.g., callback URI triggering, application execution, and the like), billing/crediting an associated entity (e.g., charging for services or controlling resource access), creation of an audit trail, and/or other suitable functionality. Metering preferably includes recording who (e.g., which account, sub-account, user, etc.) is associated with the use of media micro-service and the quantity of usage.

In one variation, the metering layer of a media processing resource instance will record individual events such as media analysis initialization requests, configuration of the media analysis, size or data volume of analyzed media, changes to an analyzed media session, when a media analysis session ends, and/or any suitable event. The metering layer may additionally measure the amount of data transfer, the time of communication sessions, and/or any suitable usage metric while facilitating a particular communication session. The records are preferably metered and logged in connection to an associated account.

A billing engine may operate independently of the metering and logging system, but may alternatively be integrated. A billing engine preferably calculates amount owed by a particular account/sub-account. The billing engine can additionally facilitate collecting and distributing of funds as appropriate. Such accounting may be used in billing or crediting an entity/account for metered usage, which functions to allow a sustainable media intelligence platform to be operated. In another variation, usage accountability can be used in limiting and balancing usage of a particular entity. As the platform is preferably multitenant, usage is preferably balanced across multiple entities. Rate limiting and action limits may be imposed at various times. Additionally, as use of a communication infrastructure is often accompanied with significant financial cost, fraudulent behavior by accounts or users of an account can be harmful to users of the platform and to the platform itself. Fraud detection can additionally be accounted for during usage of the platform.

The system may additionally include a resource management system which functions to scale and orchestrate the computing resources that support the media intelligence platform. The set of media processing instances are preferably scaled so as to support the usage requirements across a set of accounts. As a multi-tenant platform, the resources are preferably shared across accounts. In other words, a media processing resource instance used for a first account at one time may be used by a second account at a different time. The variability of usage requirements for distinct account users is preferably normalized across a set of accounts within the platform, such that the platform is scaled to support the varying usage demands of various account holders. The resource management system can preferably instantiate more media processing resources or other services, suspend resources, or terminate service instances. In one variation, a usage model is generated for at least a set of active accounts of the platform. For the users that use the platform, or alternatively that use the media intelligence platform above a particular threshold, a model may be generated that predicts their usage over time. In one instance, an account may have a substantially steady state of usage. In another instance, the amount of usage may be a function of time of day, week, month, or year. In another instance, an account may have varying trends that are predicted in real-time based on past metrics and optionally metrics of similar accounts. As one baseline heuristic for usage prediction, the media type or application use case may be used to generate a usage model. For example, an account may select the type of media processing usage and configuration during activation—selecting a media format such as audio, video, screen sharing, and an analysis process such as sentiment and emotion detection, transcription services, language detection, content detection, intent detection, or speaker detection. A predictive model may be generated using any suitable algorithm or heuristic.

The system may additionally include a queuing system which functions to facilitate rate limiting and/or resource management. The queuing system can preferably queue requests of a defined scope. A queuing scope may include queuing across a platform, within a regional segment of the platform, across an account, across a sub-account, across requests of a telephony endpoint, or across any suitable scope. In the variation of queuing with a platform scope, requests from different accounts to use a particular media processing resource may be initially queued until a resource is available. The requests may be queued according to different entity limits and policy. Requests of an account or sub-account may be associated with a dequeuing rate and limit. A dequeuing limit preferably defines a maximum frequency of a particular action with the media intelligence platform. A dequeuing limit preferably defines a hard limit on the number of particular actions within a time window. For example, an account may be limited to no more than a set data bandwidth of media analysis. Additionally or alternatively, the dequeuing of a request may be dependent at least in part on the resource usage and/or predicted impact of the request on the system.

2. Method for a Media Intelligence Platform

Figure 2:
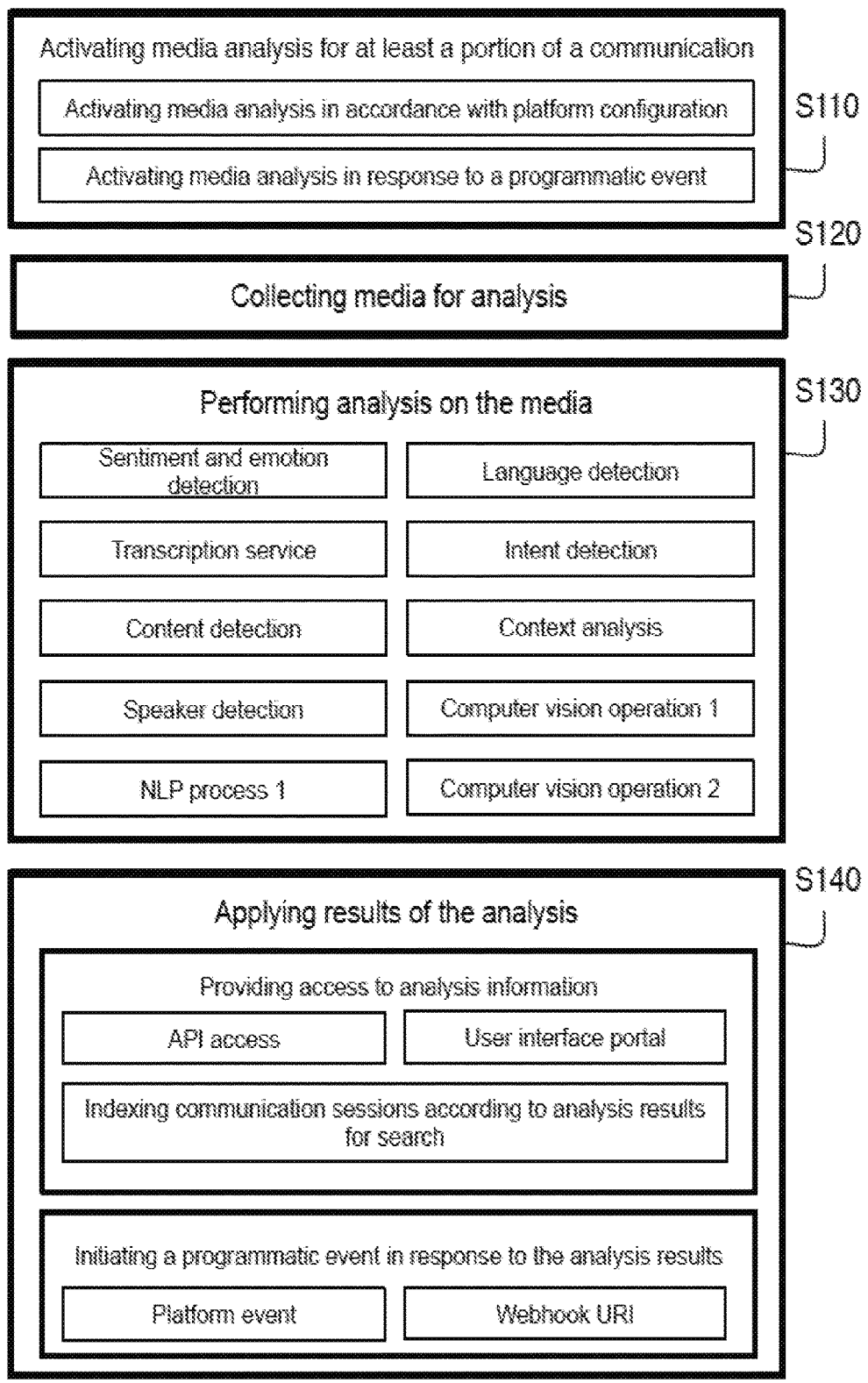
FIG. 2 is a flow diagram representation of a method of an embodiment.

As shown in FIG. 2, a method 200 for a media intelligence platform of a preferred embodiment can include activating media analysis for at least a portion of a communication S110, collecting media for analysis S120, performing analysis on the media S130, and applying results of the analysis S140. The method functions to enable developers to extract media intelligence in a communication. The method may be applied to enable a developer to control how a communication application or service integrates with provided media analysis tools. The method can additionally be applied to offer various programmatic mechanisms for using the analysis results.

The method can be used within a communication platform that facilitates communications. The media intelligence platform is preferably multitenant, which involves shared use of the platform from multiple and distinct entities. These entities can be managed within the platform as accounts, sub-accounts, endpoints (e.g., phone numbers, short codes, SIP addresses, or other communication addresses), and/or other entity constructs. The method preferably allows for customized treatment of media intelligence on a per entity basis. For example, a first account can use the analytic feature different from a second account. In one variation, the media analysis service can be used in a communication application platform used in defining communication logic during a call or related to a message, such as in the communication platform described in U.S. Pat. No. 8,306,021, issued 6 Nov. 2012, which is hereby incorporated in its entirety by this reference. The method may alternatively be used in combination with a communication service such as a platform that offers a customer facing communication application or any suitable communication based platform. The method can alternatively be used as a media intelligence micro-service. In a micro-service variation, the media intelligence may be the primary and possibly only service of the platform used in a communication. In one variation, negotiating and managing a communication occurs outside of the platform by a third party, and the third party system routes the communication to the platform to utilize the media intelligence capabilities of the micro-service. Routing the communication can include routing the communication through the media intelligence platform (e.g., the media intelligence platform is an intermediary node in the media path). Routing the communication can alternatively include terminating a media leg of a communication if, for example, a third party service streamed a branch of the media stream to the media intelligence platform.

Block S110, which includes activating media analysis for at least a portion of a communication, functions to initiate or trigger use of the media analysis. Media analysis is preferably not a mandatory feature for every entity. As mentioned above, different accounts, sub-accounts, or endpoints can utilize the media intelligence independently. A portion of a communication to receive media analysis can be a full communication session, a section of a communication session. A communication session is preferably a synchronous media session such as a voice call, a video call, a screen-sharing call, a multi-media call, or any suitable type of media-based call. The portion of a communication can alternatively be one or more asynchronous messages. The messages can be analyzed individually, as a collection, or a time ordered sequence of messages.

Activating media analysis can occur through one of various approaches. Activating media analysis may include activating media analysis in accordance with platform configuration, activating media analysis in response to a programmatic event, and/or activating media analysis in any suitable manner.

Activating media analysis in accordance with platform configuration, functions to trigger media analysis automatically. In one variation, media analysis can be pre-configured for communications (e.g., calls or messages). Media analysis can be configured to automatically activate for communications to or from a particular endpoint, communications associated with an account or sub-account, communications made during a particular time window, communications made in association with a particular location, or any suitable communication condition. During a communication, the media intelligence platform checks if the properties of that communication map to a configuration setting that enables media analysis. The media analysis configuration can include properties of the analysis such as type of media analysis and any customized settings. In one variation, an administrator can manage media analysis configuration in a dashboard. In one variation, the method can include providing a configuration dashboard for some segment of communications and a checkbox can be used to set media analysis. There can be multiple checkboxes for different types of media analysis processes. Other suitable user-interfaces may alternatively be used. Such a configuration dashboard may enable an administrator to enable/disable media analysis for communications based on involved endpoints, sub-account, types of communications, or other categories of communications. Such media analysis configuration settings may alternatively be set through an API or any suitable interface.

Activating media analysis in response to a programmatic event, functions to programmatically initiate and/or configure media analysis on demand. Use of programmatic events can enable the media analysis to be customized for individual communications. The programmatic event can include communication application instructions, a REST API call, a SIP message, or any suitable programmatic mechanism. The communication application instructions are preferably processed in directing state and communication flow of the communication such as with the telephony instructions of the communication platform referenced above. The REST API can alternatively be any suitable type of API call. An API call can enable media analysis to be triggered by an outside party with authentication credentials to act on that communication. The API call can provide or reference media to be analyzed. The API call can additionally configure properties of the media analysis. In a preferred embodiment, analysis can be initiated and/or configured from a cloud-based communications API. The cloud-based communications API can be used in combination with any suitable communication platform such as a telephony developers platform, a communication application platform, a call routing platform, a video chat platform, a conference call platform, a call center platform, or any suitable communications platform.

During live media analysis, the programmatic events can similarly be used to pause, change, and/or end media analysis. Media analysis may be enabled for the full duration of a communication but may alternatively be turned on while a communication session is active. Media analysis may additionally be turned during a session. In a variation, where media analysis is performed on provided media data, the receipt of a media analysis request along with the media can act as the analysis trigger.

Block S120, which includes collecting media for analysis, functions to obtain the media for analysis. In a preferred variation, the media intelligence platform is part of a platform that participates in routing of a media path for a communication. In synchronous communications (e.g., voice calls, video calls, multi-media streams, etc.), at least one media intelligence resource is preferably in the media path. In one variation, the platform of media intelligence may provide additional services, such as communication flow control. Such services may be used in combination with the media analysis. In another variation, a media stream may be streamed to and terminated at the media intelligence platform. For example, a third party communication system may stream a communication to the media intelligence platform, wherein the associated communication is handled through the third party communication system.

In the case where a substantially real-time media stream is available, the method can include streaming the media through synchronous analysis resources, which functions to provide substantially real-time analysis. For example, sentiment analysis could provide a real-time analysis of a user's tone along a happiness dimension (e.g., 0 for happy 10 for angry). The real-time analysis may alternatively provide time-shifted analysis, which may be streamed analysis with a fixed or restrained delay. For example, real-time audio transcription could be provided wherein the text may be output with up to a 10 second delay. The amount of delay may be dependent on the type of analysis, the service plan level of an account, and other factors.

In one variation, the media analysis can additionally or alternatively be performed on static media content. For example, the media content can be recorded, buffered, cached, or uploaded to the platform. Media analysis on static media content may be scheduled, queued, or managed in any suitable manner.

The type of media analyzed in the method may include audio, video, messaging (text, image, audio, video, and/or other media), screen-sharing media, multi-media streams, and/or any suitable type of media. Preferably, the media intelligence platform can support a set of media types. The media type and the media analysis options may be dynamically determined. However, the media intelligence platform may support a single type of media. The media can be from phone calls, SIP calls, conference calls, calls with a call center system, individual text or media messages, text or media message conversations, screen sharing applications, media sharing apps, or any suitable media related application or service.

Block S130, which includes performing analysis on media, functions to process the media and generate at least one media analysis result. At least one media analysis process is performed, but multiple media analysis processes can be used. Those processes can be performed independently, but may alternatively be dependent. Additionally, media analysis results of a first process can be used as input in a second media analysis process. For example, a transcript of an audio or video can be processed using text based sentiment analysis. The media intelligence platform can offer one or more types of media analysis processes. The performed media analysis process can have several parameters that can be defined. Media analysis parameters can be customized through the mechanism used to activate media analysis. They may alternatively be set through any programmatic mechanism.

Additionally, the different types of media analysis processes can be updated over time. The method can include deploying a media analysis process change across multiple accounts, which functions to roll out improvements and other advances across multiple accounts. In one instance, an application using the media intelligence platform can benefit from continuous media analysis processing improvements without altering integration with the media intelligence platform.

Some exemplary types of media analysis processes that may be performed by the media intelligence platform can include: sentiment and emotion detection, transcription, language detection, content detection, intent detection, context analysis, speaker detection, various computer vision techniques, various natural language techniques, and/or any suitable media analysis process. Some of the media analysis processes may be restricted to particular media formats. For example, there may be a first set of media analysis processes available for audio and second set of media analysis processes available for video. Different sets of media analysis processes may similarly be defined for text messages, messaging conversations, images, screen sharing media, or other types of media. Any suitable media pre-processing operations or data conditioning processes may be performed. The media analysis processes are preferably automatically applied based on the activating trigger or configuration. Media analysis processing can be performed in a remote location or some or at an endpoint device (e.g., performed by client SDK). Additionally, a portion of media analysis processing can be performed in one location and another portion at a second location. In one variation, previously trained machine learning system could be implemented in an endpoint device and media analyzed locally using the trained machine learning system. For example, an emotion detection neural network trained using millions of media streams in the cloud could be used on an endpoint device. In another variation, the analysis system located on an endpoint device could be trained using data on the device or transiting the device. This local data training variation could be used in detection algorithms. For example, a detection algorithm executed on an endpoint device could train using a facial recognition algorithm using photos in an album of the device.

Sentiment and emotion detection functions to classify different aspects of communication. Sentiment and emotion detection can classify the tone of a communication as conveyed through the communicated content (e.g., what is said) or how the content was communicated (e.g., tone of voice). The sentiment and emotion detection can use natural language processing in extracting sentiment or emotion from content (either conveyed in text or transcribed from audio). The sentiment and emotion detection may use various voice analysis techniques for audio and video. Facial expression recognition techniques can be used in graphical media such as images and video. The sentiment emotion detection may provide overall analysis. For example, the sentiment and emotion detection may classify a call based on a measure of aggression detected throughout the call. The sentiment emotion detection may alternatively generate a time-based analysis of sentiment. For example, the measure of aggression may be a function based on time of a call. In this example, the exact moments when one of the callers was angry could be distinguished from when the callers were calm.

Transcription functions to generate a text based machine-readable transcript of what is communicated. Various techniques in speech detection may be used. Audio and video may be transcribed into a text-based format. Transcription may additionally be used with speaker detection to assign an identity to what was said. As mentioned above, the output of a transcription service may be used in other media analysis processes such as sentiment and emotion detection.

Language detection functions to classify the language spoken during a conversation. The language detection process may tag a communication or segments of a communication with language classifiers.

Content detection processes function to classify topics, objects, and other content of a communication. Content detection may be similar to sentiment and emotion detection. However content detection preferably focuses on identifying, classifying, or providing classification probabilities for content in a communication. In image and video based communications, the content detection could include object detection processes. In text communications or communications with a generated transcript, topics of conversation could be classified. Tagging or classification probability assignments could be generated from content detection. The content detection can similarly be applied as an analysis of overall communication or for particular segments of a communication. Context of a communication can similarly be detected. This may be able to classify the environment of a call. For example, the context detection could identify calls made on the street, in an office, in a house, in a store, and the like.

Intent detection functions to detect an objective of a whole communication or a segment of a communication. In one example, intent detection can be used in interpreting a request of a caller. For example, a user could ask a question and this could be parameterized into result parameterizing the question into a normalized query.

Speaker detection functions to identify who is talking at what point in a communication. In one variation, the speaker detection marks points in time when one or more speakers are communicating. Additionally, person or entity recognition can be performed. For example, facial recognition can be used in image and video communications.

In one variation, the method can include offering customized media processing operations. In a first variation, the method can include receiving a customized media analysis process routine. The customized media analysis process routine can be a script, a configuration document, an application, or any suitable mechanism to define media processing. The customized media analysis process routine can be executed during Block S130. The customized media analysis process routine can be statically set for a class of communications (e.g., communications for an account or subaccount, types of calls, for selected communications, etc.). The customized media analysis process routine may alternatively be retrieved from a set media process URI. The media process URI is preferably retrieved using an application layer protocol. The application layer protocol can be an HTTP-based protocol (e.g., HTTP or HTTPS), SPDY, or any suitable application layer protocol. State information of the communication can be embedded into the application layer protocol request to the media process URI. The media process URI preferably refers to a server resource managed by a third party (e.g., such as a server managed by the account holder). In one variation, third parties may be able to offer specialized or custom media analysis modules that can be enabled for use with the media analysis system for a plurality of users. Such third party media analysis modules can be metered and billed individually. Policy could be configured to set permissions of an account or endpoint to use a specific third party analysis module.

Block S140, which includes applying results of the analysis, functions to provide access to analysis results and/or use the results. In a first variation, applying the results of the analysis includes providing access to analysis information. Access to analysis information can enable the results to be queried, accessed, and/or otherwise inspected using an API. The API is preferably a REST API. In one variation, the media analysis results are attached to communication meta-data. The media analysis results can additionally or alternatively be attached to a set of communications, wherein retrieving communication information additionally returns media analysis meta-data. A web interface could additionally provide a user interface portal that can be used to access media analysis results. The web interface could be a portal enabling search or browsing of media analysis information. Additionally or alternatively, the web interface could generate a set of infographics, graphs, tables, highlighted statistics, and other graphics that highlight analytics across a set of communications.

The method can additionally include indexing communication sessions according to analysis results. Indexing can make the communications searchable using media analysis properties. Additionally, the indexing can enable fuzzy search based on classification probabilities. For example, a search for angry communications may return conversations ordered by highest probability of anger to lower probability of anger.

Different types of media analysis can be applied in different ways. Transcription is preferably indexed for searchability. The transcript can additionally be linked or associated with a communication. Language detection, sentiment, content classification, context, speaker detection, and other properties can be tags associated with a communication or a particular segment of a communication.

In some implementations, the media intelligence platform stores communication records (e.g., call records, messaging records, etc.) of a communication system (e.g., a communication system of the media intelligence platform 101, a communication system of the communication resources 121-123 of FIG. 1, or a communication system external to the platform 101). In some implementations, the media intelligence platform (e.g., 101) provides the stored communication records via at least one of an API, a browsable user interface, an analytics portal, or any suitable interface. In some implementations, the media intelligence platform (e.g., 101) provides an external system (e.g., one of the app servers 151, 152) with the stored communication records via at least one of an API, a browsable user interface, an analytics portal, or any suitable interface, the communication records being communication records of an account of the media intelligence platform (e.g., an account managed by the account system 130) that is associated with the external system. In some implementations, the external system provides an API request (e.g., via the API 183) to receive communication records for an account specified in the API request, and the media intelligence platform provides the communication records for the account to the external system via the API of the platform. In some implementations, the communication records include information for at least one communication session, and information for each communication session includes at least one of: endpoint information for each communication endpoint of the communication session, an account or sub-account associated with the communication session, endpoint device information for at least one communication endpoint of the communication session, a time period of the communication session, at least one location associated with the communication session, and media analysis results associated with the communication session. In some implementations, media analysis results included in communication records includes transcription information for a communication session, language detection information for a communication session, sentiment detection information for a communication session, emotion detection information for a communication session, content classification information for a communication session, context information for a communication session, and speaker detection information for a communication session. In some implementations, media analysis results are stored in the communication records as tags associated with a communication session (or a particular segment of a communication session). In some implementations, transcription information for a communication session (that is included in communication records, e.g., communication records for a platform account) is indexed for searchability.

In some implementations, a request by an external system (e.g., one of the app servers 151, 152) for the stored communication records (e.g., provided via at least one of an API, a browsable user interface, an analytics portal, or any suitable interface) (e.g., communication records of a media intelligence platform account of the external system) specifies media analysis results properties, and the media intelligence platform provides the external system with communication records that match the specified media analysis results properties. In some implementations, the provided communication records for each communication session include media analysis results information that matches the media analysis results properties specified in the request provided by the external system. In some implementations, the platform (e.g., 101) indexes the media analysis results information of the communication records such that the media analysis results information can be queried. As an example, an entity can provide a request for communication records of communication sessions in which results of a sentiment and emotion detection media analysis indicates anger, and communication sessions in the communication records can be ordered by highest probability of anger to lower probability of anger. As an example, an entity can provide a request for communication records of communication sessions in which results of a sentiment and emotion detection media analysis indicates anger and results of a transcription media analysis service indicates that overbilling was discussed, and communication sessions in the communication records can be ordered by highest probability of anger to lower probability of anger.

An implementation of the method preferably results in the media intelligence platform observing performing media analysis on a large volume of media. The media processed is preferably used to train and improve analysis algorithms of the media intelligence platform. Analysis feedback mechanisms such as a feedback API can be used in surveying users and providing qualitative input on media analysis.

Additionally or alternatively, applying results of the analysis can include initiating a programmatic event in response to analysis results. The programmatic event can be triggered or initiated in response to particular conditions based at least in part on the analysis results. Alternatively, the programmatic events could be initiated once a media analysis result is available, which functions to regularly act on the media analysis.

In a first variation, the programmatic event is a selected platform event. A platform event is an action performed within the platform. The action of a platform event can include changes to a communication such as changing the media quality setting, calling an endpoint, sending an email, sending a message, activating another media analysis service, activating recording, or performing any suitable action. As one exemplary application of a platform event, all calls associated with a call center application may be monitored with emotion detection. When anger is detected, the programmatic event may turn on recording for that communication. In another exemplary situation, a customer service system could automatically connect a caller to a manager when a caller is getting too upset.

In a second variation, the programmatic event includes transmitting a message to a configured URI, which functions to trigger a webhook or callback URI. A URI is preferably configured in association with at least one condition based on the media analysis results. When the condition is satisfied, an application layer protocol message is transmitted to the URI. The application layer protocol message preferably includes or embeds data relating to the media analysis results. An account manager may use a callback URI for integrating a system of the account manager with events in the media intelligence platform. As opposed to triggering an internal action in the media intelligence platform, the callback URI can be used to initiate any suitable process executed by an external system. In one exemplary application of a callback URI, a callback URI may be configured and then messaged when a caller is detected to be angry. Preferably the callback URI receives a POST HTTP message with information regarding the communication and/or the media analysis. The server that handles the callback URI can process the communication and media analysis information and take any suitable action.

3. Multi-Tenant Media Processing Platform System

Figure 3A:
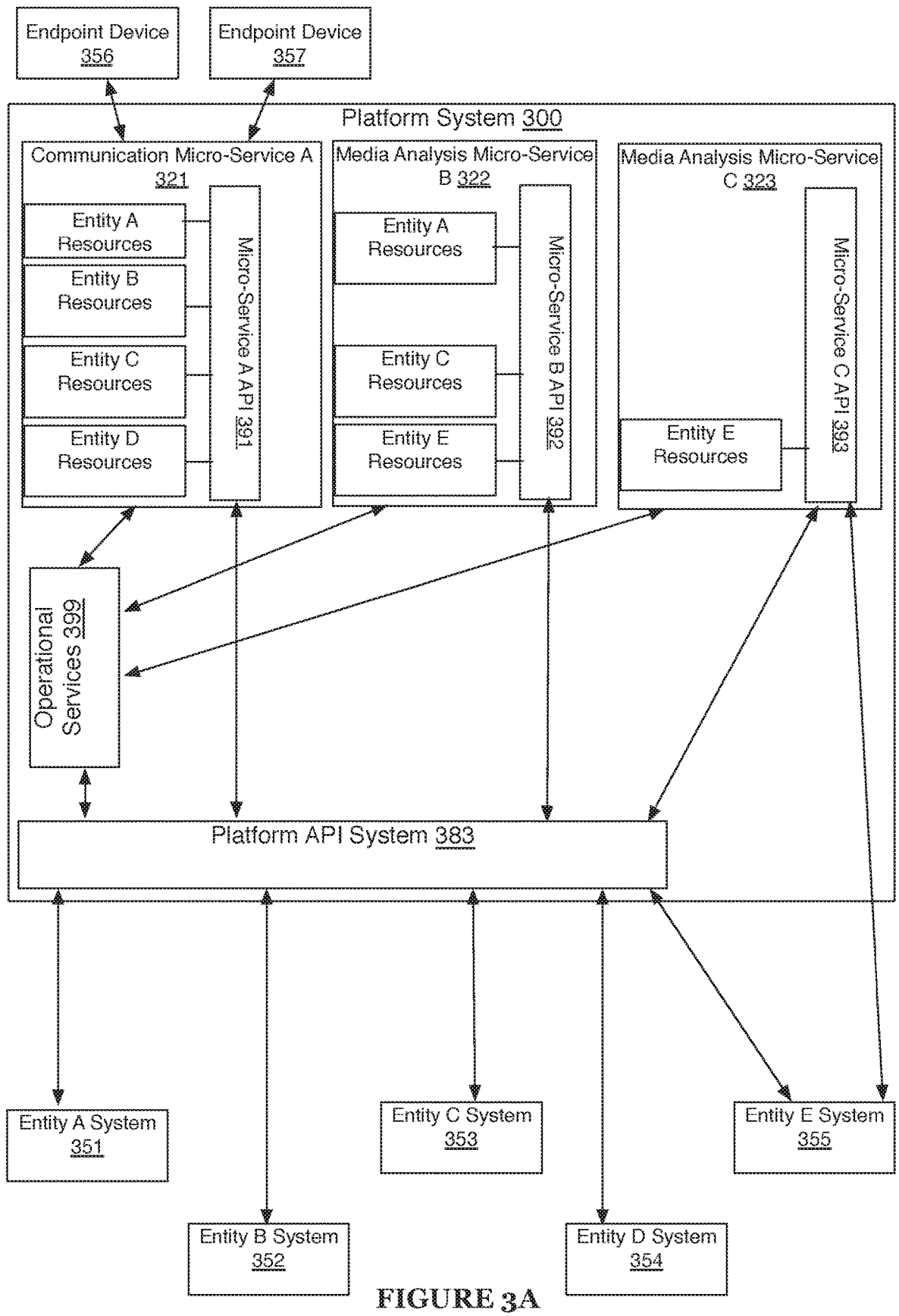
FIGS. 3A and 3B are schematic representations of a system of an embodiment.

FIG. 3A is a schematic representation of a multi-tenant media processing platform system 300 that includes one or more media analysis services (e.g., 322-323).

In some implementations, the system 300 is similar to a system for providing a micro-services communication platform of U.S. patent application Ser. No. 14/919,650, filed 21 Oct. 2015, which is hereby incorporated in its entirety by this reference. In some implementations, the system 300 is similar to the system 100 of U.S. patent application Ser. No. 14/919,650, filed 21 Oct. 2015, which is hereby incorporated in its entirety by this reference. In some implementations, the system 300 is similar to a system for providing a network discovery service (e.g., STUN/TURN service) platform of U.S. patent application Ser. No. 14/919,650, filed 21 Oct. 2015, which is hereby incorporated in its entirety by this reference. In some implementations, the system 300 is similar to the system 1300 of U.S. patent application Ser. No. 14/919,650, filed 21 Oct. 2015, which is hereby incorporated in its entirety by this reference. In some implementations, the system 300 is similar to a multi-tenant media communication platform system of U.S. patent application Ser. No. 14/919,650, filed 21 Oct. 2015, which is hereby incorporated in its entirety by this reference. In some implementations, the system 300 is similar to the multi-tenant media communication platform system 2400 of U.S. patent application Ser. No. 14/919,650, filed 21 Oct. 2015, which is hereby incorporated in its entirety by this reference.

In the implementation of FIG. 3A, the media analysis services of 322 and 323 are implemented as media analysis micro-services having a respective micro-service API (e.g., 392, 393) and at least one media processing resource (e.g., "Entity A Resources", "Entity C Resources", "Entity E Resources"). In some implementations, media analysis services are implemented as media processing resources (e.g., the media processing resources of FIG. 1). In some implementations, media analysis services are implemented as media processing resource instances.

In the embodiment of FIG. 3A, the multi-tenant media processing platform system 300 includes at least one communication service (e.g., 321). In the implementation of FIG. 3A, the communication service 321 is implemented as a communication micro-services having a respective micro-service API (e.g., 391) and at least one media processing resource (e.g., "Entity A Resources", "Entity B Resources", "Entity C Resources", "Entity D Resources"). In some implementations, the communication service is implemented as a communication resource (e.g., the communication resources of FIG. 1). In some implementations, the communication service is implemented as a communication resource instance.

The system 300 is a multi-tenant system that includes plural entities (e.g., entities of the systems 351-355 of FIG. 3A). In some embodiments, entities include one or more of accounts, sub-accounts, organizations, users and service instances. In some implementations, each service instance includes platform configuration of the platform system 300 for an application of an account (or sub-account) of the platform system 300. For example, an account holder of a platform account can have multiple applications that use the platform system 300, each application of the account holder having a separate service instance that includes platform configuration. In some embodiments, each entity is independently configurable, and the system 300 manages configuration for each configured entity. In some embodiments, entity configuration at the system 300 includes configuration for one or more micro-services of the system 300. In some embodiments, entity configuration is received from an external system of a corresponding entity via an account management interface (e.g., an account portal user interface, an account management API, and the like). In some implementations, entity configuration includes configuration similar to entity configuration of U.S. patent application Ser. No. 14/919,650, filed 21 Oct. 2015, which is hereby incorporated in its entirety by this reference. In some implementations, entity configuration includes configuration as described herein for FIGS. 1 and 2. In some implementations, entity configuration includes media analysis configuration, as described herein. In some implementations, entity configuration includes platform configuration, as described herein. In some implementations, entity configuration includes policy configuration, as described herein. In some implementations, entity configuration is stored at the system 300. In some implementations, entity configuration is stored at a remote data storage device that is external to the system 300.

In some embodiments, the system 300 generates one or more micro-services resources for a configured entity.

As depicted in FIG. 3A, the media processing platform system 300 includes micro-services 321-323, operational services 399, and a media processing platform API system 383.

Media Processing Platform

In some embodiments, the system 300 is a media processing platform system for multi-tenant peer-to-peer real-time media communication. In some embodiments, the system 300 is a media processing platform system for multi-tenant peer-to-peer asynchronous media communication. In some embodiments, the system 300 is a media processing platform system for multi-tenant peer-to-peer synchronous media communication.

In some embodiments, each media analysis micro-service (e.g., 322, 323) provides at least one media analysis service for a synchronous media stream. In some embodiments, the synchronous media stream is a synchronous media stream between two synchronous media communication endpoints (e.g., media communication endpoints of different endpoint devices). In some embodiments, the two synchronous media communication endpoints communicate via a media communication channel that is established between the two endpoints. In some embodiments, the synchronous media stream is a synchronous media stream that is broadcasted to at least one synchronous media communication endpoint. In some embodiments, a broadcasting media communication endpoint broadcasts the synchronous media stream to each destination media communication endpoint via at least one media communication channel that is established between the broadcasting endpoint and at least one destination endpoint.

The micro-services 322, 323 provide at least one of a sentiment and emotion detection service, a transcription service, a language detection service, a content detection service, an intent detection service, a speaker detection service, a context analysis service, a computer vision service, and a natural language processing service, as described above for FIGS. 1 and 2.

In some implementations, the system 300 includes one or more of signaling micro-services (e.g., network discovery services, such as STUN/TURN services) and media micro-services (e.g., a transcoding micro-service, a recording micro-service, a mixing micro-service, a conferencing micro-service, a media intelligence micro-service, a text-to-speech micro-service, a speech detection micro-service, a notification micro-service, a call-progress micro-service, and the like).

In some implementations, signaling micro-services of the platform system 300 are similar to micro-services of a signaling and control system of U.S. patent application Ser. No. 14/919,650, filed 21 Oct. 2015, which is hereby incorporated in its entirety by this reference. In some implementations, signaling micro-services of the platform system 300 are similar to micro-services of the signaling and control system 120 of U.S. patent application Ser. No. 14/919,650, filed 21 Oct. 2015, which is hereby incorporated in its entirety by this reference.

In some implementations, signaling micro-services of the platform system 300 are similar to a STUN/TURN micro-service (STMS) of U.S. patent application Ser. No. 14/919,650, filed 21 Oct. 2015, which is hereby incorporated in its entirety by this reference. In some implementations, signaling micro-services of the platform system 300 are similar to the STUN/TURN micro-services (STMS) of FIG. 13 of U.S. patent application Ser. No. 14/919,650, filed 21 Oct. 2015, which is hereby incorporated in its entirety by this reference.

In some implementations, media analysis services of the platform system 300 are similar to media micro-services of a media service system of U.S. patent application Ser. No. 14/919,650, filed 21 Oct. 2015, which is hereby incorporated in its entirety by this reference. In some implementations, media analysis services of the platform system 300 are similar to media micro-services of the media service system no of U.S. patent application Ser. No. 14/919,650, filed 21 Oct. 2015, which is hereby incorporated in its entirety by this reference. In some implementations, media analysis services of the platform system 300 are similar to the media micro-services 1381 and 1382 of U.S. patent application Ser. No. 14/919,650, filed 21 Oct. 2015, which is hereby incorporated in its entirety by this reference.

Figure 3B:
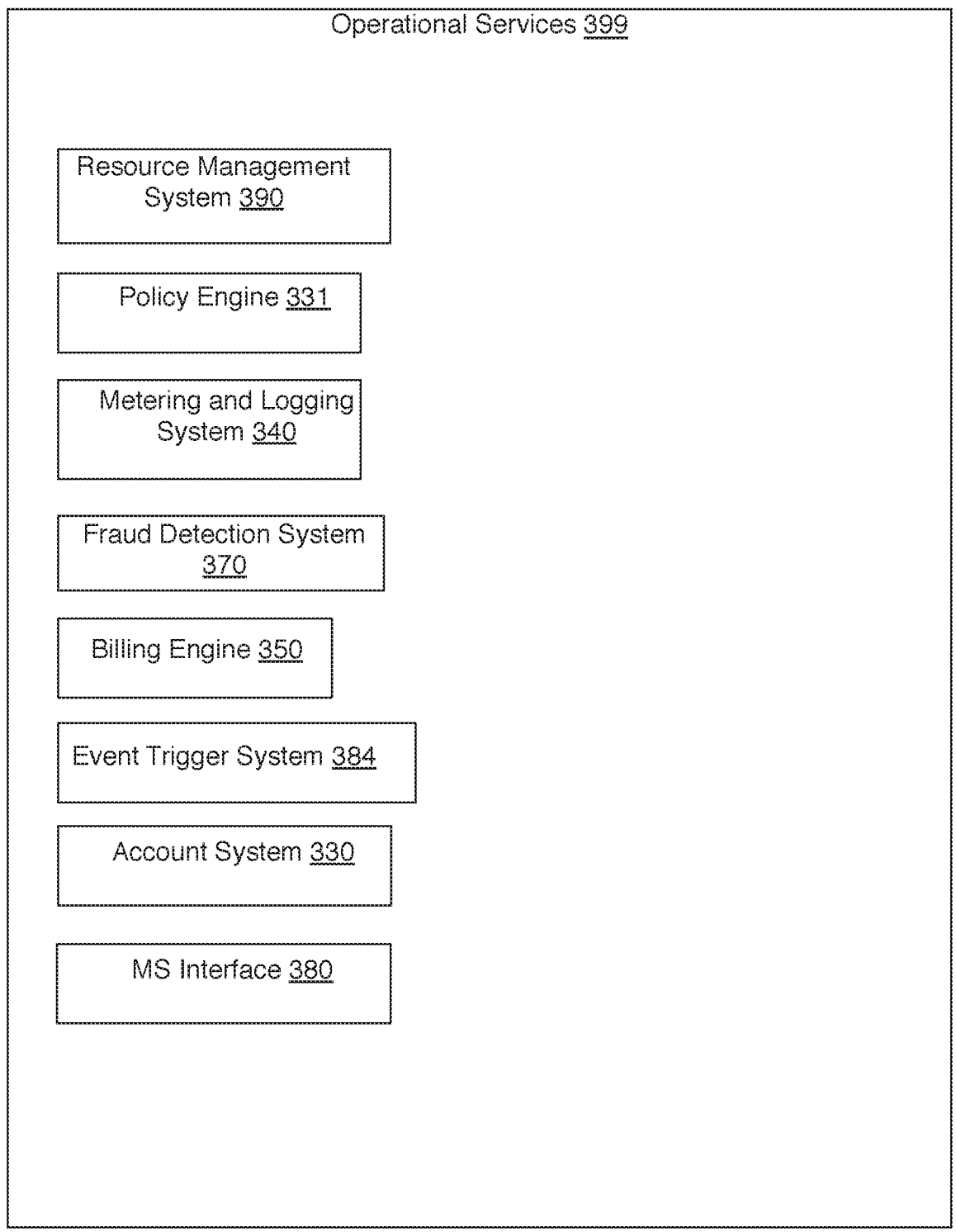

In some embodiments, the operational services 399 include a resource management system 390, a Micro-Service (MS) interface 380, an account system 330, a policy engine 331, a metering and logging system 340, a fraud detection system 370, a billing engine 350, and an Event Trigger System 384, as depicted in FIG. 3B.

In some implementations, the account system 330 is similar to the account system described herein for FIG. 1. In some implementations, the metering and logging system 340 is similar to the metering and logging system described herein for FIG. 1. In some implementations, the policy engine 331 is similar to the policy engine described herein for FIG. 1. In some implementations, the billing engine 350 is similar to the billing engine described herein for FIG. 1. In some implementations, the resource management system 390 is similar to the resource management system described herein for FIG. 1.

In some implementations, the system 300 includes a queueing system similar to the queueing system described herein for FIG. 1

In some implementations, the resource management system 390, the MS interface 380, the account system 330, the policy engine 331, the metering and logging system 340, the fraud detection system 370, the billing engine 350, the communication platform API system 383, and the Event Trigger System 384 are similar to a resource management system, a MS interface, an account system, a policy engine, a metering and logging system, a fraud detection system, a billing engine, an API service, and an Event Trigger System (respectively) of U.S. patent application Ser. No. 14/919,650, filed 21 Oct. 2015, which is hereby incorporated in its entirety by this reference.

In some implementations, the resource management system 390, the MS interface 380, the account system 330, the policy engine 331, the metering and logging system 340, the fraud detection system 370, the billing engine 350, the communication platform API system 383, and the Event Trigger System 384 are similar to the resource management system 1390, the MS interface 1380, the account system 1330, the policy engine 1331, the metering and logging system 1340, the fraud detection system 1370, the billing engine 1350, the API service 1383, and the Event Trigger System 1384 (respectively) of FIG. 13 of U.S. patent application Ser. No. 14/919,650, filed 21 Oct. 2015, which is hereby incorporated in its entirety by this reference. In some implementations, the system 300 includes a queueing system similar to the queueing system 1360 of FIG. 13 of U.S. patent application Ser. No. 14/919,650, filed 21 Oct. 2015, which is hereby incorporated in its entirety by this reference.

In some implementations, one or more of the micro-services 321-323, are accessible by a system (e.g., Entity A system 351, Entity B system 352, Entity C system 353, Entity D system 354, and Entity E system 355) that is external to the system 300 and that is a system of an entity of the system 300. In some implementations, one or more of the micro-services 321-323, are accessible by an external system of an entity via the API system 383. In some implementations, one or more of the micro-services 321-323, are accessible by an external system of an entity via a micro-service API of the respective micro-service (e.g., micro-service A API 391, micro-service B API 392, micro-service C API 393). In some implementations, an external system of an entity accesses one or more of the micro-services 321-323 by providing at least one signaling request to the system 300 (e.g., via a signaling interface of the system 300, a queueing system, and the like).

In some implementations, one or more of the micro-services 321-323 are accessible by another micro-service of the system 300. In some implementations, one or more of the micro-services 321-323 are accessible by another micro-service of the system 300 via the MS interface 380. In some implementations, one or more of the micro-services 321-323 are accessible by another micro-service of the system 300 via the API service 383. In some implementations, one or more of the micro-services 321-323 are accessible by another micro-service of the system 300 via a respective micro service API (e.g., one of the APIs 391-393). In some implementations, one or more of the micro-services 321-323 are accessible by another micro-service of the system 300 via a signaling request.

In some implementations, one or more of the micro-services 321-323 include RESTful API resources (e.g., Entity A Resources, Entity B Resources, Entity C Resources, Entity D Resources, and Entity E Resources as depicted in FIG. 3A), which act as endpoints that can act as a mechanism for specifying requested information or requesting particular actions. In some implementations, the resources are expressed as URI's or resource paths. In some implementations, the RESTful API resources are responsive to different types of HTTP methods such as GET, Put, POST and/or DELETE. In some implementations, each micro service API (e.g., one of the APIs 391-393) is a RESTful API.

In some implementations, one or more of the micro-services 321-323 include a process manager, an authentication layer, and a metering layer similar to the process managers, the authentication layers, and the metering layers of U.S. patent application Ser. No. 14/919,650, filed 21 Oct. 2015, which is hereby incorporated in its entirety by this reference. In some implementations, one or more of the micro-services 321-323 include a process manager, an authentication layer, and a metering layer similar to the process managers, the authentication layers, and the metering layers (e.g., 1311-1313) of FIG. 13 of U.S. patent application Ser. No. 14/919,650, filed 21 Oct. 2015, which is hereby incorporated in its entirety by this reference.

In some implementations, the platform system 300 includes media analysis service configuration for a plurality of entities (e.g., the entities corresponding to the systems 351-355 of FIG. 3A) configured for use of the platform system (e.g., 300). In some implementations, the media analysis service configuration is managed by operational services of the platform system (e.g., the operational services 399 of FIG. 3A). In some implementations, the media analysis service configuration is managed by an account system of the platform system (e.g., the account system 330 of FIG. 3B). In some implementations, the media analysis service configuration is managed by a policy engine of the platform system (e.g., the policy engine 331 of FIG. 3B). In some implementations, the media analysis service configuration is managed by a respective micro-service of the platform system (e.g., 322-323 FIG. 3A).

In some implementations, the platform system 300 includes communication service configuration for a plurality of entities (e.g., the entities corresponding to the systems 351-355 of FIG. 3A) configured for use of the platform system (e.g., 300). In some implementations, the communication service configuration is managed by operational services of the platform system (e.g., the operational services 399 of FIG. 3A). In some implementations, the communication service configuration is managed by an account system of the platform system (e.g., the account system 330 of FIG. 3B). In some implementations, the communication service configuration is managed by a policy engine of the platform system (e.g., the policy engine 331 of FIG. 3B). In some implementations, the communication service configuration is managed by a respective micro-service of the platform system (e.g., 321 FIG. 3A).

4. Multi-Tenant Media Processing Platform Method

Figure 4:
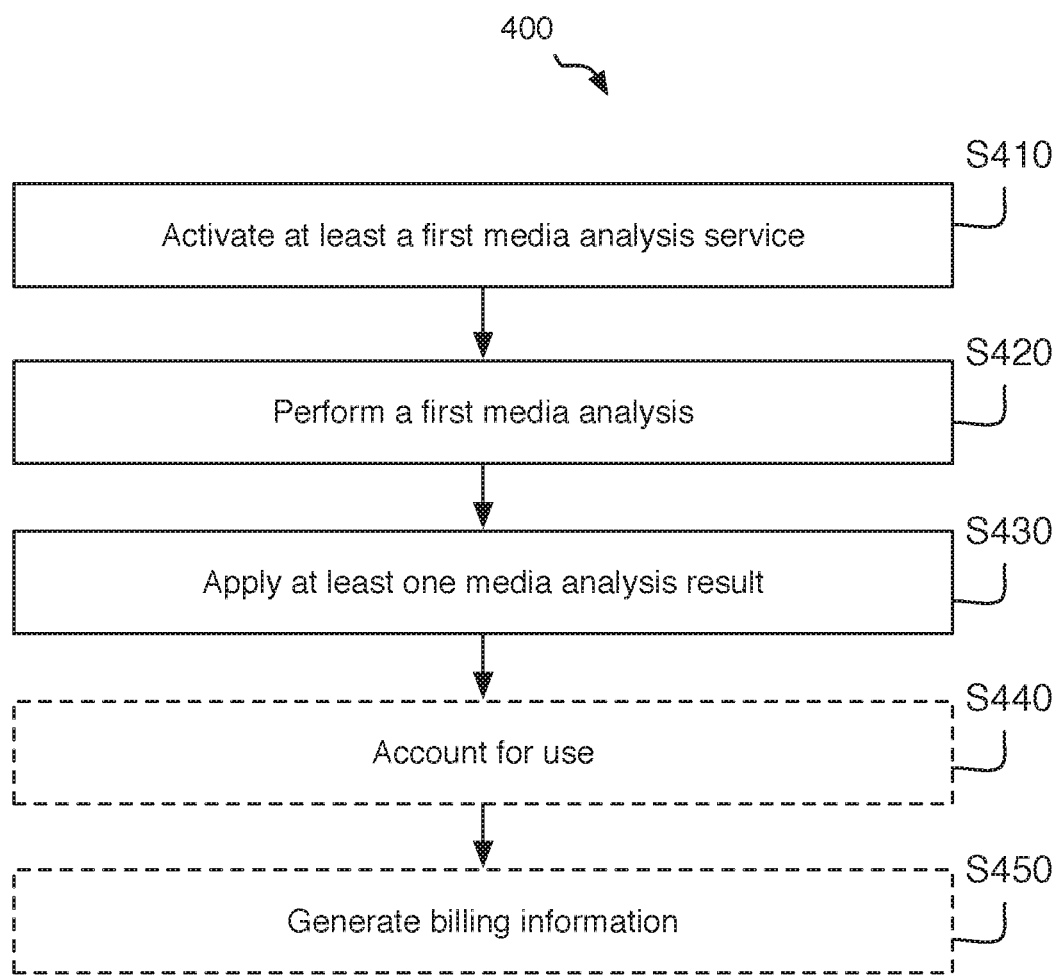
FIG. 4 is a block diagram representation of a method of an embodiment.

As shown in FIG. 4, the method 400 is performed at a multi-tenant media processing platform system (e.g., the system 300 of FIG. 3A) that includes a plurality of media analysis services (e.g., implemented as micro-services 322-323 of FIG. 3A).

The method 400 includes: activating at least a first media analysis service (e.g., 322, 323) of the plurality of media analysis services for at least a portion of an active communication session of an entity in the platform system (process S410); the first activated media analysis service performing a first media analysis on media of the active communication session that is collected by the platform system, the first activated media analysis service performing the first media analysis on the collected media while the communication session is active to generate a first media analysis result (process S420); during the active communication session, applying at least one media analysis result (process S430).

In some embodiments, the process S410 is similar to S110 of FIG. 2. In some embodiments, the process S420 is similar to S130 of FIG. 2. In some embodiments, the media of the active communication session is collected as described above for S120 of FIG. 2. In some embodiments, the process S430 is similar to S140 of FIG. 2.

In some embodiments, the platform system 300 activates the first media analysis service responsive to a determination by the platform system 300 that at least one property of media of the active communication session that is collected by the platform system 300 maps to at least one setting of entity platform configuration that enables the first media analysis, the entity platform configuration being platform configuration of the entity (e.g., an entity of one of the systems 351-355) in the platform system.

In some embodiments, the platform system 300 activates the first media analysis service responsive to a communication application instruction. In some embodiments, the communication application instruction is provided by an external system of the entity (e.g., one of the systems 351-355). In some embodiments, the communication application instruction is provided to the communication micro-service 321 by an external system of the entity (e.g., one of the systems 351-355), the communication micro-service 321 executes the communication application instruction, and the platform system 300 activates the first media analysis service responsive to execution of the communication application instruction. In some embodiments, the communication micro-service 321 receives the communication application instruction responsive to an incoming telephony communication request to an communication endpoint that is mapped to an application resource of the external system of the entity, and the communication micro-service receives the communication application instruction responsive to the communication micro-service providing an application layer request to a URI (Uniform Resource Identifier) of the external system. In some embodiments, responsive to the communication micro-service 321 receiving an incoming telephony communication request to a communication endpoint that is mapped to an application resource of an external system (e.g., one of 351-355) of the entity, the communication micro-service receives provides an application layer request to a URI (Uniform Resource Identifier) of the external system (e.g., 351-355) and receives the communication application instruction from the external system in a response to the request, the communication micro-service 321 executes the communication application instruction, and the platform system 300 activates the first media analysis service responsive to execution of the communication application instruction by the communication micro-service 321.

In some embodiments, the platform system 300 activates the first media analysis service responsive to a REST API call. In some embodiments, the REST API call is provided by an external system of the entity. In some embodiments, the platform system 300 activates the first media analysis service responsive to a SIP message. In some embodiments, the SIP message call is provided by an external system of the entity.

In some embodiments, activating at least a first media analysis service (the process S410) includes activating the first media analysis service and a second media analysis service of the plurality of media analysis services for at least a portion of the active communication session of the entity in the platform system.

In some embodiments, the platform system 300 activates the second media analysis service responsive to a determination by the platform system 300 that at least one property of media of the active communication session that is collected by the platform system 300 maps to at least one setting of entity platform configuration that enables the second media analysis, the entity platform configuration being platform configuration of the entity (e.g., an entity of one of the systems 351-355) in the platform system.

In some embodiments, the platform system 300 activates the second media analysis service responsive to a communication application instruction. In some embodiments, the communication application instruction is provided by an external system of the entity (e.g., one of the systems 351-355). In some embodiments, the communication application instruction is provided to the communication microservice 321 by an external system of the entity (e.g., one of the systems 351-355), the communication micro-service 321 executes the communication application instruction, and the platform system 300 activates the second media analysis service responsive to execution of the communication application instruction. In some embodiments, the communication micro-service 321 receives the communication application instruction responsive to an incoming telephony communication request to an communication endpoint that is mapped to an application resource of the external system of the entity, and the communication micro-service receives the communication application instruction responsive to the communication micro-service providing an application layer request to a URI (Uniform Resource Identifier) of the external system. In some embodiments, responsive to the communication micro-service 321 receiving an incoming telephony communication request to a communication endpoint that is mapped to an application resource of an external system (e.g., one of 351-355) of the entity, the communication micro-service receives provides an application layer request to a URI (Uniform Resource Identifier) of the external system (e.g., 351-355) and receives the communication application instruction from the external system in a response to the request, the communication micro-service 321 executes the communication application instruction, and the platform system 300 activates the second media analysis service responsive to execution of the communication application instruction by the communication micro-service 321.

In some embodiments, the platform system 300 activates the second media analysis service responsive to a REST API call. In some embodiments, the REST API call is provided by an external system of the entity. In some embodiments, the platform system 300 activates the second media analysis service responsive to a SIP message. In some embodiments, the SIP message call is provided by an external system of the entity.

In some embodiments, the platform system 300 activates each media analysis service responsive to at least one of: a determination by the platform system that at least one property of media of the active communication session that is collected by the platform system maps to at least one setting of entity platform configuration that enables media analysis, the entity platform configuration being platform configuration of the entity in the platform system; a communication application instruction; a REST API call; and a SIP message. In some embodiments, the communication application instruction is provided by an external system of the entity (e.g., one of the systems 351-355). In some embodiments, the communication application instruction is provided to the communication micro-service 321 by an external system of the entity (e.g., one of the systems 351-355), the communication micro-service 321 executes the communication application instruction, and the platform system 300 activates a media analysis service responsive to execution of the communication application instruction. In some embodiments, the communication micro-service 321 receives the communication application instruction responsive to an incoming telephony communication request to an communication endpoint that is mapped to an application resource of the external system of the entity, and the communication micro-service receives the communication application instruction responsive to the communication micro-service providing an application layer request to a URI (Uniform Resource Identifier) of the external system. In some embodiments, responsive to the communication micro-service 321 receiving an incoming telephony communication request to a communication endpoint that is mapped to an application resource of an external system (e.g., one of 351-355) of the entity, the communication micro-service receives provides an application layer request to a URI (Uniform Resource Identifier) of the external system (e.g., 351-355) and receives the communication application instruction from the external system in a response to the request, the communication micro-service 321 executes the communication application instruction, and the platform system 300 activates a media analysis service responsive to execution of the communication application instruction by the communication micro-service 321

In some embodiments, the entity platform configuration is provided by at least one external system (e.g., 351-355) via an account management interface (e.g., of the API System 383 of FIG. 3) of the media processing platform system 300, the account management interface including a least one of an account portal user interface and an account management API.

In some embodiments in which the first media analysis service and the second media analysis service are activated, the first media analysis service and the second media analysis service are both active during at least a portion of the active communication session.

In some embodiments, the platform configuration specifies automatic activation of at least one media analysis service for at least one of: a communication of the entity to a particular endpoint; a communication session of the entity from a particular endpoint; a communication session of the entity associated with a particular account; a communication session of the entity made during a particular time window; and a communication session of the entity made in association with a particular location.

In some embodiments, communication application instructions are processed in directing state and communication flow of the communication session.

Performing Media Analysis

In some embodiments, the method 400 includes activating a second media analysis service of the plurality of media analysis services for at least a portion of the active communication session of the entity in the platform system, and the process S420 includes the second activated media analysis service performing a second media analysis on the collected media while the communication session is active to generate a second media analysis result, the second media analysis being different from the first media analysis.

In some embodiments, activating at least a first media analysis service of the plurality of media analysis services for at least a portion of an active communication session of an entity in the platform system (process S410) includes: the platform system 300 selecting at least the first media analysis service from the plurality of media analysis services of the platform system 300, the plurality of media analysis services including at least one of a sentiment and emotion detection service, a transcription service, a language detection service, a content detection service, an intent detection service, a speaker detection service, a context analysis service, a computer vision service, and a natural language processing service; and the platform system 300 activating each selected media analysis service. In some embodiments, activating at least a first media analysis service of the plurality of media analysis services for at least a portion of an active communication session of an entity in the platform system (process S410) includes: the platform system 300 selecting at least the first media analysis service from the plurality of media analysis services of the platform system 300, the plurality of media analysis services including at context analysis service, and a computer vision service; and the platform system 300 activating each selected media analysis service. In some implementations, the platform system 300 selects each selected media analysis service responsive to a programmatic event. In some implementations, the programmatic event is provided by an external system (e.g., 351-355 of FIG. 3) of the entity. In some implementations, the programmatic event includes reception at the platform system 300 of a communication application instruction that initiates the activation. In some implementations, the programmatic event includes reception at the platform system 300 of a REST API call that initiates the activation. In some implementations, the platform system 300 selects each selected media analysis service in accordance with entity platform configuration of the entity.

In some embodiments, activating at least a first media analysis service of the plurality of media analysis services for at least a portion of an active communication session of an entity in the platform system (process S410) includes: activating a sentiment and emotion detection service.

In some embodiments, the first media analysis service collects the media of the active communication session. In some embodiments, the second media analysis service collects the media of the active communication session.

In some embodiments, a REST API call that activates a media analysis service is provided by an outside party with authentication credentials to act on the communication session, the API call providing the media of the communication session to be analyzed and configuration of the media analysis service.

In some embodiments, the process S410 includes activating a second media analysis service of the plurality of media analysis services for at least a portion of the active communication session of the entity in the platform system, and the method 400 includes the second media analysis service performing a second media analysis on the first media analysis result while the communication session is active to generate a second media analysis result, the second media analysis being different from the first media analysis. In some implementations, the first media analysis service transmits an application layer protocol message to a Uniform Resource Identifier (URI) of the second media analysis service, the application layer protocol message providing data relating to the first media analysis result. In some embodiments, a callback URI parameter of the first media analysis service is configured to specify the URI of the second media analysis service.

In some implementations, the media is real-time media, and the first media analysis service performs real-time media analysis on the real-time media. In some implementations, the media is stored media, and the first media analysis service performs asynchronous media analysis on the stored media.

In some implementations in which a second media analysis service is activated, the media is real-time media, and the second media analysis service performs real-time media analysis on the real-time media. In some implementations in which a second media analysis service is activated, the media is stored media, and the second media analysis service performs asynchronous media analysis on the stored media.

In some implementations, the first media analysis service is a sentiment and emotion detection service. In some implementations in which a second media analysis service is activated, the second media analysis service is a sentiment and emotion detection service, and the first media analysis service is a different media analysis service. In some implementations in which a second media analysis service is activated, the first media analysis service is a sentiment and emotion detection service, and the second media analysis service is a different media analysis service.

Collecting Media for Analysis

In some implementations, the media processing platform system 300 collects media of the active communication session by using a communication service of the system 300 (e.g., the communication service provided by the micro-service 321 of FIG. 3). In some implementations, the media processing platform system 300 collects media of the active communication session from an external system, such as, for example, a communication system that is external to the media processing platform system 300, a communication endpoint device (e.g., 356, 357 of FIG. 3), a system of the entity (e.g., one of the systems 351-355 of FIG. 3). In some implementations, a communication endpoint device includes at least one of a mobile phone, computer, tablet, portable computing device, and the like.

In some implementations, the first activated media analysis service (e.g., the media analysis service of the micro-service 322) collects media of the active communication session from a communication service of the system 300 (e.g., the communication service of the micro-service 321 of FIG. 3). In some implementations, the first activated media analysis service (e.g., the media analysis service of the micro-service 322) collects media of the active communication session from another media analysis service of the system 300 (e.g., a media analysis service of the micro-service 323 of FIG. 3). In some implementations, the first activated media analysis service collects media of the active communication session from an external system, such as, for example, a communication system that is external to the media processing platform system 300, a communication endpoint device (e.g., 356, 357 of FIG. 3), a system of the entity (e.g., one of the systems 351-355 of FIG. 3). In some implementations, a communication endpoint device includes at least one of a mobile phone, computer, tablet, portable computing device, and the like.

In some implementations, a second activated media analysis service (e.g., the media analysis service of the micro-service 323) collects media of the active communication session from a communication service of the system 300 (e.g., the communication service of the micro-service 321 of FIG. 3). In some implementations, the second activated media analysis service (e.g., the media analysis service of the micro-service 323) collects media of the active communication session from another media analysis service of the system 300 (e.g., a media analysis service of the micro-service 322 of FIG. 3). In some implementations, the second activated media analysis service collects media of the active communication session from an external system, such as, for example, a communication system that is external to the media processing platform system 300, a communication endpoint device (e.g., 356, 357 of FIG. 3), a system of the entity (e.g., one of the systems 351-355 of FIG. 3). In some implementations, a communication endpoint device includes at least one of a mobile phone, computer, tablet, portable computing device, and the like.

Applying Media Analysis Results

In some embodiments, applying at least one media analysis result includes applying the first media analysis result. In some implementations in which the first media analysis service and the second media analysis service are activated, applying at least one media analysis result includes applying the first media analysis result. In some implementations in which the first media analysis service and the second media analysis service are activated, applying at least one media analysis result includes applying the second media analysis result. In some implementations in which the first media analysis service and the second media analysis service are activated, applying at least one media analysis result includes applying the first media analysis result and the second media analysis result.

Applying Media Analysis Results: Changing the Active Communication Session

In some embodiments, applying the at least one media analysis result (process S430) includes changing the active communication session in response to the first media analysis result.

In some embodiments, applying the at least one media analysis result (process S430) includes transmitting at least one application layer protocol message to at least one callback URI of a communication service of the platform system (e.g., a callback URI of the communication micro-service 321, such as, for example, a callback URI corresponding to the communication micro-service API 391) of the entity, the at least one application layer protocol message providing the at least one media analysis result.

In some embodiments in which the first media analysis service and the second media analysis service are activated, applying the at least one media analysis result (process S430) includes changing the active communication session in response to the first media analysis result and the second media analysis result. In some embodiments in which the first media analysis service and the second media analysis service are activated, applying the at least one media analysis result (process S430) includes changing the active communication session in response to the second media analysis result. In some embodiments in which the first media analysis service and the second media analysis service are activated, applying the at least one media analysis result (process S430) includes changing the active communication session in response to the first media analysis result.

In some implementations, changing the active communication session includes changing media of the communication session.

In some implementations, changing the active communication session includes at least one of: changing a media quality of the active communication session; calling an endpoint, sending an e-mail, sending a message, activating another media analysis service, and activating recording. In some implementations, the communication service (e.g., of 321) changes the active communication session.

Applying Media Analysis Results: Providing Analysis Results Using a Callback URI In some embodiments, applying the at least one media analysis result (process S430) includes transmitting at least one application layer protocol message to at least one callback URI of an external system (e.g., 351-355) of the entity, the at least one callback URI being specified by entity platform configuration. In some implementations, the at least one application layer protocol message provides the first media analysis result.

In some implementations in which the first media analysis service and the second media analysis service are activated, the at least one application layer protocol message provides the first media analysis result. In some implementations in which the first media analysis service and the second media analysis service are activated, the at least one application layer protocol message provides the second media analysis result. In some implementations in which the first media analysis service and the second media analysis service are activated, the at least one application layer protocol message provides the first media analysis result and the second media analysis result.

In some embodiments, applying the at least one media analysis result (process S430) includes applying the first media analysis result by transmitting at least one application layer protocol message to at least one callback URI of an external system (e.g., 351-355) of the entity, the at least one callback URI being specified by a REST API call that activates the first media analysis service, the at least one application layer protocol message providing the first media analysis result.

Applying Media Analysis Results: Providing Access

In some embodiments, applying the at least one media analysis result (process S430) includes: providing access to the at least one media analysis result as described above for S140. In some embodiments, applying the at least one media analysis result (process S430) includes providing access to the at least one media analysis result via a REST API (e.g., the an API of the API system 383). In some embodiments, applying the at least one media analysis result (process S430) includes: providing access to the at least one media analysis result by attaching the at least one media analysis result to communication meta-data (e.g., communication metadata provided by the communication service 321 of FIG. 3). In some embodiments, applying the at least one media analysis result (process S430) includes providing access to the at least one media analysis result via a user interface portal provided by the system 300. In some embodiments, the system 300 indexes communication sessions (e.g., communication sessions of the communication micro-service of 321) according to the at least one media analysis results.

In some implementations, providing access to the at least one media analysis result includes: indexing communication sessions according to analysis results. Indexing can make the communications searchable using media analysis properties. Additionally, the indexing can enable fuzzy search based on classification probabilities. For example, a search for angry communications may return conversations ordered by highest probability of anger to lower probability of anger. Different types of media analysis can be applied in different ways. Transcription is preferably indexed for searchability. The transcript can additionally be linked or associated with a communication. Language detection, sentiment, content classification, context, speaker detection, and other properties can be tags associated with a communication or a particular segment of a communication.

In some implementations, providing access to the at least one media analysis result includes: the platform system 300 providing stored communication records via at least one of an API (e.g., 383 of FIG. 3), a browsable user interface, an analytics portal, or any suitable interface. In some implementations, the platform system 300 stores communication records (e.g., call records, messaging records, etc.) of a communication system (e.g., a communication system of the platform system 300, a communication system of the micro-service 321, a communication system external to the system 300). In some implementations, the system 300 provides an external system (e.g., 351-355) with the stored communication records via at least one of an API, a browsable user interface, an analytics portal, or any suitable interface, the communication records being communication records of an account of the platform system (e.g., an account managed by the account system 330) that is associated with the external system. In some implementations, the external system provides an API request (e.g., via the API 383) to receive communication records for an account specified in the API request, and the platform system provides the communication records for the account to the external system via the API of the platform.

In some implementations, the communication records include information for at least one communication session, and information for each communication session includes at least one of: endpoint information for each communication endpoint of the communication session, an account or subaccount associated with the communication session, endpoint device information (e.g., of a device 356, 357 of FIG. 3) for at least one communication endpoint of the communication session, a time period of the communication session, at least one location associated with the communication session, and media analysis results associated with the communication session. In some implementations, media analysis results included in communication records includes the at least one media analysis result. In some implementations, media analysis results included in communication records includes transcription information for a communication session, language detection information for a communication session, sentiment detection information for a communication session, emotion detection information for a communication session, content classification information for a communication session, context information for a communication session, and speaker detection information for a communication session. In some implementations, media analysis results are stored in the communication records as tags associated with a communication session (or a particular segment of a communication session). In some implementations, transcription information for a communication session (that is included in communication records, e.g., communication records for a platform account) is indexed for searchability.

In some implementations, a request by an external system (e.g., one of the app servers 351-355) for the stored communication records (e.g., provided via at least one of an API, a browsable user interface, an analytics portal, or any suitable interface) (e.g., communication records of a platform system account of the external system) specifies media analysis results properties, and the platform system provides the external system with communication records that match the specified media analysis results properties. In some implementations, the provided communication records for each communication session include media analysis results information that matches the media analysis results properties specified in the request provided by the external system. In some implementations, the platform system (e.g., 300) indexes the media analysis results information of the communication records such that the media analysis results information can be queried. As an example, an entity can provide a request for communication records of communication sessions in which results of a sentiment and emotion detection media analysis indicates anger, and communication sessions in the communication records can be ordered by highest probability of anger to lower probability of anger. As an example, an entity can provide a request for communication records of communication sessions in which results of a sentiment and emotion detection media analysis indicates anger and results of a transcription media analysis service indicates that overbilling was discussed, and communication sessions in the communication records can be ordered by highest probability of anger to lower probability of anger.

Accounting and Billing

In some embodiments, the method 400 includes: accounting for the use of the first activated media analysis service on behalf of the entity (process S440); and generating billing information for the entity based on the accounting for the use of the first activated media analysis service (process S450).

In some embodiments in which the first media analysis service and the second media analysis service are activated, the method 400 includes: accounting for the use of the first activated media analysis service on behalf of the entity (process S440); accounting for the use of the second activated media analysis service on behalf of the entity, the platform system accounting for the use of the second activated media analysis service independently from the accounting for the use of the first activated media analysis service (process S440); and generating billing information for the entity based on the accounting for the use of the first activated media analysis service and the accounting for the use of the second activated media analysis service (process S450).

Additional Embodiments

In some embodiments, the plurality of media analysis services includes at least one of a sentiment and emotion detection service, a transcription service, a language detection service, a content detection service, an intent detection service, a speaker detection service, a context analysis service, a computer vision service, and a natural language processing service.

In some embodiments, the active communication session is a communication session between at least a first communication endpoint device (e.g., 356) and a second communication endpoint device (e.g., 357 of FIG. 3), the first communication endpoint device and the second communication endpoint device each being external to the platform system 300, and each media analysis service (e.g., each service of the media analysis micro-services 322-323) is constructed to perform media analysis on media of the communication session between at least the first communication endpoint device and the second communication endpoint device.

In some embodiments, plurality of media analysis services includes at least one of a sentiment and emotion detection service, a language detection service, an intent detection service, a speaker detection service, a context analysis service, and a computer vision service.

In some embodiments, the active communication session is a peer-to-peer communication session.

In some embodiments, the active communication session is a real-time communication session.

In some embodiments, the media is a real-time media stream.

In some embodiments, at least one REST API call is provided by an external system of the entity.

In some embodiments, the first media analysis service includes a customized media analysis process routine, as described above for block S130.

In some embodiments, the method 400 includes: the system 300 training at least one media analysis service by using the first media analysis result. In some embodiments, the method 400 includes: the system 300 training at least one media analysis service by using the first media analysis result and user feedback provided by an external system (e.g., 351-357) via a feedback API of the system 300 (e.g., a feedback API of the API system 383). In some implementations, the system 300 receives user feedback via the feedback API, the feedback indicating a quality of media analysis provided by the first media analysis service, and the system 300 trains the first media analysis service based on the received feedback. In some implementations, the system maintains a history data that includes media analysis results and corresponding media and user feedback of the first media analysis service, and the system trains the first media analysis service by using the history data.

Method Operation

In some implementations, the process S410 is performed by the API system 383. In some implementations, the process S410 is performed by at least one micro-service (e.g., 321, 322, 323). In some implementations, the process S410 is performed by the API system 383 and at least one micro-service. In some implementations, the process S410 is performed by the API system 383, at least one micro-service, and the operations services 399. In some implementations, the process S410 is performed by the operational services 399. In some implementations, the process S410 is performed by the account system 330. In some implementations, the process S410 is performed by the account system 330 and the policy engine 331. In some implementations, the process S410 is performed by two or more of the account system 330, the policy engine 331, and the MS interface 380.

In some implementations, the process S420 is performed by at least one media analysis micro-service (e.g., 322, 323). In some implementations, the process S420 is performed by the API system 383 and at least one media analysis micro-service. In some implementations, the process S420 is performed by the API system 383, at least one media analysis micro-service, and the operations services 399.

In some implementations, the process S430 is performed by the API system 383. In some implementations, the process S430 is performed by at least one micro-service (e.g., 321, 322, 323). In some implementations, the process S430 is performed by the API system 383 and at least one micro-service. In some implementations, the process S430 is performed by the API system 383, at least one micro-service, and the operations services 399. In some implementations, the process S430 is performed by the operational services 399. In some implementations, the process S430 is performed by the account system 330. In some implementations, the process S430 is performed by the account system 330 and the policy engine 331. In some implementations, the process S430 is performed by two or more of the account system 330, the policy engine 331, and the MS interface 380.

In some implementations, the process S440 is performed by the API system 383. In some implementations, the process S440 is performed by at least one micro-service (e.g., 321, 322, 323). In some implementations, the process S440 is performed by the API system 383 and at least one micro-service. In some implementations, the process S440 is performed by the API system 383, at least one micro-service, and the operations services 399. In some implementations, the process S440 is performed by the operational services 399. In some implementations, the process S440 is performed by the account system 330. In some implementations, the process S440 is performed by the account system 330 and the policy engine 331. In some implementations, the process S440 is performed by two or more of the account system 330, the policy engine 331, and the MS interface 380.

In some implementations, the process S450 is performed by the API system 383. In some implementations, the process S450 is performed by at least one micro-service (e.g., 321, 322, 323). In some implementations, the process S450 is performed by the API system 383 and at least one micro-service. In some implementations, the process S450 is performed by the API system 383, at least one micro-service, and the operations services 399. In some implementations, the process S450 is performed by the operational services 399. In some implementations, the process S450 is performed by the account system 330. In some implementations, the process S450 is performed by the account system 330 and the policy engine 331. In some implementations, the process S450 is performed by two or more of the account system 330, the policy engine 331, and the MS interface 380.

5. Multi-Tenant Media Processing Platform Method 500

Figure 5:
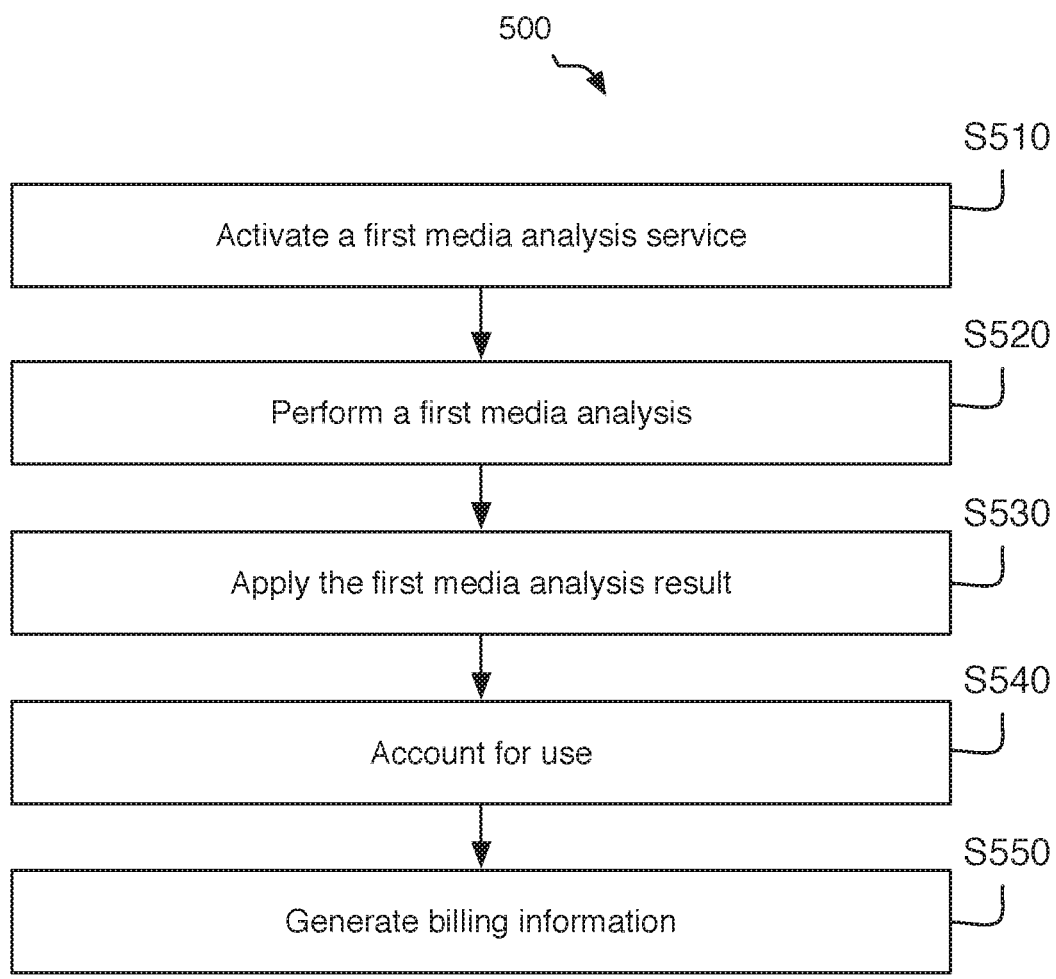
FIG. 5 is a block diagram representation of a method of an embodiment.

As shown in FIG. 5, the method 500 is performed at a multi-tenant media processing platform system (e.g., the system 300 of FIG. 3A) that includes a plurality of media analysis services (e.g., implemented as micro-services 322-323 of FIG. 3A).

The method 500 includes: activating a first media analysis service (e.g., of the micro-services 322, 323 of FIG. 3) of the plurality of media analysis services for at least a portion of an active communication session of an entity (e.g., an entity of one of systems 351-355) in the platform system, the platform system activating the first media analysis service responsive to a REST API call provided by an external system (e.g., 351-355) of the entity (process S510); the first activated media analysis service performing a first media analysis on media of the active communication session that is collected by the first activated media analysis service, while the communication session is active, to generate a first media analysis result (process S520); during the active communication session, applying the first media analysis result by transmitting at least one application layer protocol message to at least one callback URI of an external system (e.g., 351-355) of the entity, the at least one callback URI being specified by the REST API call, the at least one application layer protocol message providing the first media analysis result (process S530); accounting for the use of the first activated media analysis service on behalf of the entity (process S540); generating billing information for the entity based on the accounting for the use of the first activated media analysis service (process S5). Each external system (e.g., 351-355) of the entity is a system of an account holder of a platform account of the multi-tenant media processing platform system, each external system being external to the platform system 300.

Selection of at Least One Media Analysis Service

In some embodiments, activating a first media analysis service of the plurality of media analysis services for at least a portion of an active communication session of an entity in the platform system (the process S510) includes: the platform system 300 selecting at least the first media analysis service from the plurality of media analysis services of the platform system 300, the plurality of media analysis services including at least one of a sentiment and emotion detection service, a transcription service, a language detection service, a content detection service, an intent detection service, a speaker detection service, a context analysis service, a computer vision service, and a natural language processing service; and the platform system 300 activating each selected media analysis service. In some embodiments, activating a first media analysis service of the plurality of media analysis services for at least a portion of an active communication session of an entity in the platform system (the process S510) includes: the platform system 300 selecting at least the first media analysis service from the plurality of media analysis services of the platform system 300, the plurality of media analysis services including at least one of a sentiment and emotion detection service, a context analysis service, and a computer vision service; and the platform system 300 activating each selected media analysis service. In some implementations, the platform system 300 selects each selected media analysis service responsive to a programmatic event. In some implementations, the programmatic event is provided by an external system (e.g., 351-355 of FIG. 3) of the entity. In some implementations, the programmatic event includes reception at the platform system 300 of a communication application instruction that initiates the activation. In some implementations, the programmatic event includes reception at the platform system 300 of a REST API call that initiates the activation. In some implementations, the platform system 300 selects each selected media analysis service in accordance with entity platform configuration of the entity.

In some embodiments, activating at least a first media analysis service of the plurality of media analysis services for at least a portion of an active communication session of an entity in the platform system (process S410) includes: activating a sentiment and emotion detection service.

Activation REST API Call and Callback URI

In some implementations, the first media analysis service is activated for a specified active communication session, such as for example, a pre-established communication session that is active prior to activation of the first media analysis service. In some implementations, the first media analysis service is activated for all active communication sessions of the entity.

In some implementations, the activation REST API call to activate the first media analysis service specifies at least the communication session and at least the first activated media analysis service. In some implementations, the REST API call to activate the first media analysis service specifies at least the communication session, at least the first activated media analysis service, and at least the callback URI for the first media analysis service. In some implementations, the REST API call to activate the first media analysis service specifies at least the communication session, at least the first activated media analysis service, and at least media analysis service configuration for the first media analysis service. In some implementations, the activation REST API call specifies the communication session by using a session ID of a communication session of the communication micro-service (e.g., 321) of the platform 300.

In some implementations, the activation REST API call to activate the first media analysis service includes (or references) the media of the communication session, and specifies at least the first activated media analysis service. In some implementations, the REST API call to activate the first media analysis service includes (or references) the media of the communication session, and specifies at least the first activated media analysis service, and at least the callback URI for the first media analysis service. In some implementations, the REST API call to activate the first media analysis service includes (or references) the media of the communication session, and specifies at least the first activated media analysis service, and at least media analysis service configuration for the first media analysis service.

In some implementations, the callback URI is specified by a callback URI parameter of the media analysis service configuration of the activation REST API call. In some implementations, the callback URI is specified by a callback URI parameter of the media analysis service configuration of the first media analysis micro-service (e.g., 322, 323). In some implementations, the callback URI is specified by a callback URI parameter of the media analysis service configuration of the account system 330.

In some implementations, the callback URI is specified by a callback URI parameter included in entity platform configuration of the entity (e.g., entity platform configuration of the account system 330 of FIG. 3).

In some implementations, the callback URI for the first media analysis service is provided by at least one external system (e.g., 351-355) of the entity via an account management interface (e.g., of the API System 383 of FIG. 3) of the media processing platform system 300, the account management interface including a least one of an account portal user interface and an account management API.

Activation REST API Call and Callback URI: Two Media Analysis Services

In some implementations, the REST API specifies: the first activated media analysis service, a second media analysis service, the callback URI for the first media analysis result, and a callback URI for a second media analysis result generated by the second media analysis service. In some implementations, the REST API specifies the first activated media analysis service, a second media analysis service, and the callback URI, and the specified callback URI is for the first media analysis result and a second media analysis result generated by the second media analysis service.

In some implementations, the REST API specifies: the first activated media analysis service, a second media analysis service, the callback URI for the first media analysis result, and a platform event to be performed based on the second media analysis result generated by the second media analysis service.

In some implantations, the platform event is an action performed within the platform 300. In some implementations, the platform event is an action performed by a communication micro-service (e.g., 321) of the platform 300. In some implementations, action of a platform event can include changes to a communication such as changing the media quality setting, calling an endpoint, sending an email, sending a message, activating another media analysis service, activating recording, or performing any suitable action. In some implementations, an exemplary application of a platform event includes monitoring all calls associated with a call center application with emotion detection. In some implementations, an exemplary application of a platform event includes monitoring all calls associated with a call center application with emotion detection; when anger is detected, the programmatic event turns on recording for that communication. In some implementations, an exemplary application of a platform event includes a customer service system automatically connecting a caller to a manager when a caller is getting too upset.

In some embodiments in which the second media analysis service is activated, the method 500 includes: activating the second media analysis service (e.g., of the micro-services 322, 323 of FIG. 3) of the plurality of media analysis services for at least a portion of an active communication session of an entity (e.g., an entity of one of systems 351-355) in the platform system, the platform system activating the second media analysis service responsive to a REST API call provided by an external system (e.g., 351-355) of the entity.

In some embodiments in which the second media analysis service is activated, the method 500 includes: the second activated media analysis service performing a second media analysis on media of the active communication session that is collected by the second activated media analysis service, while the communication session is active, to generate a second media analysis result.

In some embodiments in which the second media analysis service is activated, the method 500 includes: the second activated media analysis service performing a second media analysis on the first analysis result to generate a second media analysis result.

In some embodiments in which the second media analysis service is activated, the method 500 includes: during the active communication session, applying the second media analysis result by transmitting at least one application layer protocol message to at least one callback URI of an external system (e.g., 351-355) of the entity, the at least one callback URI being specified by the REST API call to activate the second media analysis service, the at least one application layer protocol message providing the second media analysis result.

In some embodiments in which the second media analysis service is activated, the method 500 includes: during the active communication session, applying the second media analysis result by performing a platform event, as described herein for S140 of FIG. 1.

In some embodiments in which the second media analysis service is activated, the method 500 includes: accounting for the use of the second activated media analysis service on behalf of the entity; and generating billing information for the entity based on the accounting for the use of the second activated media analysis service.

In some embodiments in which the second media analysis service is activated, the first media analysis service and the second media analysis service are both active during at least a portion of the active communication session.

In some embodiments in which the second media analysis service is activated, use of the second activated media analysis service is accounted for independently from use of the first activated media analysis service.

In some embodiments in which the second media analysis service is activated, media analysis of the second media analysis service is different from media analysis of the first media analysis service.

In some embodiments in which the second media analysis service is activated, a callback URI parameter of the first media analysis service specifies a URI of the second media analysis service, the first media analysis service transmits an application layer protocol message to the URI of the second media analysis service, the message providing data relating to the first media analysis result, the second media analysis service performing a second media analysis on the first media analysis result while the communication session is active to generate a second media analysis result, the second media analysis result being different from the first media analysis result.

In some implementations, the media is real-time media, and the first media analysis service performs real-time media analysis on the real-time media. In some implementations, the media is stored media, and the first media analysis service performs asynchronous media analysis on the stored media.

In some embodiments in which the second media analysis service is activated, the media is real-time media, and the first media analysis service performs real-time media analysis on the real-time media. In some embodiments in which the second media analysis service is activated, the media is stored media, and the first media analysis service performs asynchronous media analysis on the stored media.

In some embodiments in which the second media analysis service is activated, the media is real-time media, and the second media analysis service performs real-time media analysis on the real-time media. In some embodiments in which the second media analysis service is activated, the media is stored media, and the second media analysis service performs asynchronous media analysis on the stored media.

In some implementations, the first media analysis service is a sentiment and emotion detection service. In some implementations in which a second media analysis service is activated, the second media analysis service is a sentiment and emotion detection service, and the first media analysis service is a different media analysis service. In some implementations in which a second media analysis service is activated, the first media analysis service is a sentiment and emotion detection service, and the second media analysis service is a different media analysis service.

Deactivating Media Analysis

In some embodiments, the method 500 includes: de-activating the first media analysis service (e.g., of the micro-services 322, 323 of FIG. 3) of the plurality of media analysis services for at least a portion of an active communication session of an entity (e.g., an entity of one of systems 351-355) in the platform system, the platform system de-activating the first media analysis service responsive to a de-activation REST API call provided by the external system. In some implementations, the REST API call to de-activate the first media analysis service specifies at least the communication session and at least the first activated media analysis service. In some implementations, the de-activation REST API call specifies the communication session by using a session ID of a communication session of the communication micro-service (e.g., 321) of the platform 300. In some implementations, the REST API call to de-activate the first media analysis service specifies at least the first activated media analysis service. In some implementations, the REST API call to de-activate the first media analysis service specifies at least the first activated media analysis service and a media identifier.

In some implementations, the first media analysis service is de-activated for a specified active communication session. In some implementations, the first media analysis service is de-activated for all active communication sessions of the entity.

Configuring Media Analysis

In some embodiments, the method 500 includes: configuring the first media analysis service (e.g., of the micro-services 322, 323 of FIG. 3) of the plurality of media analysis services for at least a portion of an active communication session of an entity (e.g., an entity of one of systems 351-355) in the platform system, the platform system configuring the first media analysis service responsive to a configuration REST API call provided by the external system. In some implementations, the REST API call to configure the first media analysis service specifies at least the first activated media analysis service, and specifies configuration for at least the first activated media analysis service. In some implementations, the REST API call to configure the first media analysis service specifies the active communication session, specifies at least the first activated media analysis service, and specifies configuration for at least the first activated media analysis service. In some implementations, configuration of the configuration REST API call includes the callback URI of the first media analysis service.

In some implementations, the activation REST API call specifies the communication session by using a session ID of a communication session of the communication microservice (e.g., 321) of the platform 300.

In some implementations, the REST API call to configure the first media analysis service specifies at least the first activated media analysis service and specifies configuration for at least the first activated media analysis service. In some implementations, the REST API call to configure the first media analysis service specifies at least the first activated media analysis service, and specifies configuration for at least the first activated media analysis service, and a media identifier.

In some implementations, the first media analysis service is configured for a specified active communication session, such as for example, a pre-established communication session that is active prior to configuration of the first media analysis service. In some implementations, the first media analysis service is configured for all active communication sessions of the entity.

Customized Media Analysis

In some embodiments, the activation REST API specifies a customized media analysis service (that includes a customized media analysis process routine) as the first media analysis service, as described above for block S130. In some embodiments, the activation REST API includes program instructions (or a link to program instructions) for the customized media analysis service, and responsive to the activation REST API request, the platform system 300 generates a customized media analysis micro-service (e.g., 322, 323) that provides a media analysis service according to the received program instructions.

In some embodiments, the activation REST API includes program instructions (or a link to program instructions) for the customized media analysis service, and responsive to the activation REST API request, the platform system 300 controls a communication micro-service (e.g., 321) to provide a media analysis service according to the received program instructions.

APIs

In some implementations, the REST API call is an API call of the Platform API System 383. In some implementations, the REST API call is an API call of the first media analysis service (e.g., an API call of one of the media analysis micro-service APIs 392, 393). In some implementations, the REST API call is an API call of a communication service of the platform (e.g., an API call of the communication micro-service API 391).

In some implementations, an activation REST API call is an API call of the Platform API System 383. In some implementations, an activation REST API call is an API call of a respective media analysis service (e.g., an API call of one of the media analysis micro-service APIs 392, 393). In some implementations, an activation REST API call is an API call of a communication service of the platform (e.g., an API call of the communication micro-service API 391).

In some implementations, a de-activation REST API call is an API call of the Platform API System 383. In some implementations, a de-activation REST API call is an API call of a respective media analysis service (e.g., an API call of one of the media analysis micro-service APIs 392, 393). In some implementations, a de-activation REST API call is an API call of a communication service of the platform (e.g., an API call of the communication micro-service API 391).

In some implementations, a configuration REST API call is an API call of the Platform API System 383. In some implementations, a configuration REST API call is an API call of a respective media analysis service (e.g., an API call of one of the media analysis micro-service APIs 392, 393).

In some implementations, a configuration REST API call is an API call of a communication service of the platform (e.g., an API call of the communication micro-service API 391).

Stand-Alone Media Analysis

In some implementations, the activation REST API call to activate the first media analysis service includes (or references) the media of the communication session, specifies at least the first activated media analysis service, and the activation REST API call is an API all of the first media analysis service (e.g., an API call of one of the media analysis micro-service APIs 392, 393). For example, as shown in FIG. 3, in an exemplary API call, the "ENTITY E System" 355 provides an activation REST API call to the media analysis micro-service C 323 via the micro-service's API 393, and the activation REST API call provides the media to be analyzed by the media analysis service of the micro-service 323. In such an example, the media can be media of a communication session that is managed by a communication platform (or service) that is external to the platform system 300. In such an example, the micro-service 323 can be implemented as a sentiment and emotion detection media analysis micro-service.

Feedback

In some embodiments, the method 500 includes: the system 300 training at least one media analysis service by using the first media analysis result. In some embodiments, the method 500 includes: the system 300 training at least one media analysis service by using the first media analysis result and user feedback provided by an external system (e.g., 351-357) via a feedback API of the system 300 (e.g., a feedback API of the API system 383). In some implementations, the system 300 receives user feedback via the feedback API, the feedback indicating a quality of media analysis provided by the first media analysis service, and the system 300 trains the first media analysis service based on the received feedback. In some implementations, the system maintains a history data that includes media analysis results and corresponding media and user feedback of the first media analysis service, and the system trains the first media analysis service by using the history data.

Applying Media Analysis Results to a Communication Service

In some embodiments, the method 500 includes: during the active communication session, applying the first media analysis result by transmitting at least one application layer protocol message to at least one callback URI of a communication service of the platform system (e.g., a callback URI of the communication micro-service 321, such as, for example, a callback URI corresponding to the communication micro-service API 391) of the entity, the at least one application layer protocol message providing the first media analysis result.

Applying Media Analysis: Providing Access to Results

In some embodiments, the method 500 includes: providing access to the first media analysis result as described above for S140.

In some implementations, providing access to the first media analysis result includes: indexing communication sessions according to analysis results. Indexing can make the communications searchable using media analysis properties. Additionally, the indexing can enable fuzzy search based on classification probabilities. For example, a search for angry communications may return conversations ordered by highest probability of anger to lower probability of anger. Different types of media analysis can be applied in different ways. Transcription is preferably indexed for searchability. The transcript can additionally be linked or associated with a communication. Language detection, sentiment, content classification, context, speaker detection, and other properties can be tags associated with a communication or a particular segment of a communication.

In some implementations, providing access to the first media analysis result includes: the platform system 300 providing stored communication records via at least one of an API (e.g., 383 of FIG. 3), a browsable user interface, an analytics portal, or any suitable interface. In some implementations, the platform system 300 stores communication records (e.g., call records, messaging records, etc.) of a communication system (e.g., a communication system of the platform system 300, a communication system of the microservice 321, a communication system external to the system 300). In some implementations, the system 300 provides an external system (e.g., 351-355) with the stored communication records via at least one of an API, a browsable user interface, an analytics portal, or any suitable interface, the communication records being communication records of an account of the platform system (e.g., an account managed by the account system 330) that is associated with the external system. In some implementations, the external system provides an API request (e.g., via the API 383) to receive communication records for an account specified in the API request, and the platform system provides the communication records for the account to the external system via the API of the platform.

In some implementations, the communication records include information for at least one communication session, and information for each communication session includes at least one of: endpoint information for each communication endpoint of the communication session, an account or subaccount associated with the communication session, endpoint device information (e.g., of a device 356, 357 of FIG. 3) for at least one communication endpoint of the communication session, a time period of the communication session, at least one location associated with the communication session, and media analysis results associated with the communication session. In some implementations, media analysis results included in communication records includes the first media analysis result. In some implementations, media analysis results included in communication records includes transcription information for a communication session, language detection information for a communication session, sentiment detection information for a communication session, emotion detection information for a communication session, content classification information for a communication session, context information for a communication session, and speaker detection information for a communication session. In some implementations, media analysis results are stored in the communication records as tags associated with a communication session (or a particular segment of a communication session). In some implementations, transcription information for a communication session (that is included in communication records, e.g., communication records for a platform account) is indexed for searchability.

In some implementations, a request by an external system (e.g., one of the app servers 351-355) for the stored communication records (e.g., provided via at least one of an API, a browsable user interface, an analytics portal, or any suitable interface) (e.g., communication records of a platform system account of the external system) specifies media analysis results properties, and the platform system provides the external system with communication records that match the specified media analysis results properties. In some implementations, the provided communication records for each communication session include media analysis results information that matches the media analysis results properties specified in the request provided by the external system. In some implementations, the platform system (e.g., 300) indexes the media analysis results information of the communication records such that the media analysis results information can be queried. As an example, an entity can provide a request for communication records of communication sessions in which results of a sentiment and emotion detection media analysis indicates anger, and communication sessions in the communication records can be ordered by highest probability of anger to lower probability of anger. As an example, an entity can provide a request for communication records of communication sessions in which results of a sentiment and emotion detection media analysis indicates anger and results of a transcription media analysis service indicates that overbilling was discussed, and communication sessions in the communication records can be ordered by highest probability of anger to lower probability of anger.

Additional Embodiments

In some embodiments, the process S510 is similar to S110 of FIG. 2. In some embodiments, the process S520 is similar to S530 of FIG. 2. In some embodiments, the media of the active communication session is collected as described above for S120 of FIG. 2. In some embodiments, the process S530 is similar to S140 of FIG. 2. In some embodiments, the process S510 is similar to S410 of FIG. 4. In some embodiments, the process S520 is similar to S520 of FIG. 4. In some embodiments, the process S530 is similar to S430 of FIG. 4. In some embodiments, the process S550 is similar to S450 of FIG. 4.

In some embodiments, the first media analysis service is a sentiment and emotion detection service. The active communication session is a communication session between at least a first communication endpoint device (e.g., 356 of FIG. 3) and a second communication endpoint device (e.g., 357 of FIG. 3), the first communication endpoint device and the second communication endpoint device each being external to the platform system (e.g., 300 of FIG. 3). The first media analysis service is constructed to perform media analysis on media of the communication session between at least the first communication endpoint device and the second communication endpoint device. The active communication session is at least one of: a peer-to-peer communication session; and a real-time communication session, and the media is a real-time media stream.

In some embodiments, the platform system activates a second media analysis service of the plurality of media analysis services. The platform system activates the second media analysis service responsive to a REST API call provided by an external system (e.g., 351-355) of the entity. The second activated media analysis service performs a second media analysis to generate a second media analysis result.

In some embodiment, the media is real-time media, and the first media analysis service performs real-time media analysis on the real-time media; and the second activated media analysis service performs real-time media analysis on at least one of the real-time media and the first media analysis result.

In some embodiments, during the active communication session, the platform system (e.g., 300) applies the second media analysis result by transmitting at least one application layer protocol message to a communication service (e.g., of the micro-service 321 of FIG. 3) of the platform system, the at least one application layer protocol message providing the second media analysis result.

In some embodiments, the second media analysis is different from the first media analysis.

In some embodiments, the media is real-time media, and the first media analysis service performs real-time media analysis on the real-time media; and the second activated media analysis service performs asynchronous media analysis on stored media.

In some embodiments, activating the first media analysis service includes: the platform system selecting at least the sentiment and emotion detection service as the first media analysis service from the plurality of media analysis services of the platform system, the plurality of media analysis services including the sentiment and emotion detection service and at least one of a context analysis service, and a computer vision service; and the platform system activating each selected media analysis service.

In some embodiments, the REST API specifies at least the communication session and at least the first activated media analysis service.

In some embodiments, the method 500 includes at least one of: at the multi-tenant media processing platform system, de-activating the first media analysis service responsive to a de-activation REST API call provided by an external system of the entity, the de-activation REST API call specifying the communication session; and at the multi-tenant media processing platform system, configuring the first media analysis service responsive to a configuration REST API call provided by an external system of the entity, the configuration REST API call specifying the communication session.

In some embodiment, the platform system 300 trains at least one media analysis service by using the first media analysis result and user feedback provided by an external system (e.g., 351-355) via a feedback API of the platform system. The platform system receives user feedback via the feedback API, the feedback indicating a quality of media analysis provided by the first media analysis service, and the platform system trains the first media analysis service based on the received feedback.

In some embodiments, the platform system maintains history data that includes media analysis results and corresponding media and user feedback of the first media analysis service, and the platform system trains the first media analysis service by using the history data.

In some embodiments, the REST API specifies program instructions for a customized media analysis service, and responsive to the REST API request, the platform system performs at least one of: generation of a customized media analysis service according to the received program instructions; and control of a communication service of the platform system to provide a media analysis service according to the received program instructions.

Method Operation

In some implementations, the process S510 is performed by the API system 383. In some implementations, the process S510 is performed by at least one micro-service (e.g., 321, 322, 323). In some implementations, the process S510 is performed by the API system 383 and at least one micro-service. In some implementations, the process S510 is performed by the API system 383, at least one micro-service, and the operations services 399. In some implementations, the process S510 is performed by the operational services 399. In some implementations, the process S510 is performed by the account system 330. In some implementations, the process S510 is performed by the account system 330 and the policy engine 331. In some implementations, the process S510 is performed by two or more of the account system 330, the policy engine 331, and the MS interface 380.

In some implementations, the process S520 is performed by at least one media analysis micro-service (e.g., 322, 323). In some implementations, the process S520 is performed by the API system 383 and at least one media analysis micro-service. In some implementations, the process S520 is performed by the API system 383, at least one media analysis micro-service, and the operations services 399.

In some implementations, the process S530 is performed by the API system 383. In some implementations, the process S530 is performed by at least one micro-service (e.g., 321, 322, 323). In some implementations, the process S530 is performed by the API system 383 and at least one micro-service. In some implementations, the process S530 is performed by the API system 383, at least one micro-service, and the operations services 399. In some implementations, the process S530 is performed by the operational services 399. In some implementations, the process S530 is performed by the account system 330. In some implementations, the process S530 is performed by the account system 330 and the policy engine 331. In some implementations, the process S530 is performed by two or more of the account system 330, the policy engine 331, and the MS interface 380.

In some implementations, the process S540 is performed by the API system 383. In some implementations, the process S540 is performed by at least one micro-service (e.g., 321, 322, 323). In some implementations, the process S540 is performed by the API system 383 and at least one micro-service. In some implementations, the process S540 is performed by the API system 383, at least one micro-service, and the operations services 399. In some implementations, the process S540 is performed by the operational services 399. In some implementations, the process S540 is performed by the account system 330. In some implementations, the process S540 is performed by the account system 330 and the policy engine 331. In some implementations, the process S540 is performed by two or more of the account system 330, the policy engine 331, and the MS interface 380.

In some implementations, the process S550 is performed by the API system 383. In some implementations, the process S550 is performed by at least one micro-service (e.g., 321, 322, 323). In some implementations, the process S550 is performed by the API system 383 and at least one micro-service. In some implementations, the process S550 is performed by the API system 383, at least one micro-service, and the operations services 399. In some implementations, the process S550 is performed by the operational services 399. In some implementations, the process S550 is performed by the account system 330. In some implementations, the process S550 is performed by the account system 330 and the policy engine 331. In some implementations, the process S550 is performed by two or more of the account system 330, the policy engine 331, and the MS interface 380.

6. Multi-Tenant Media Processing Platform Method 600

Figure 6:
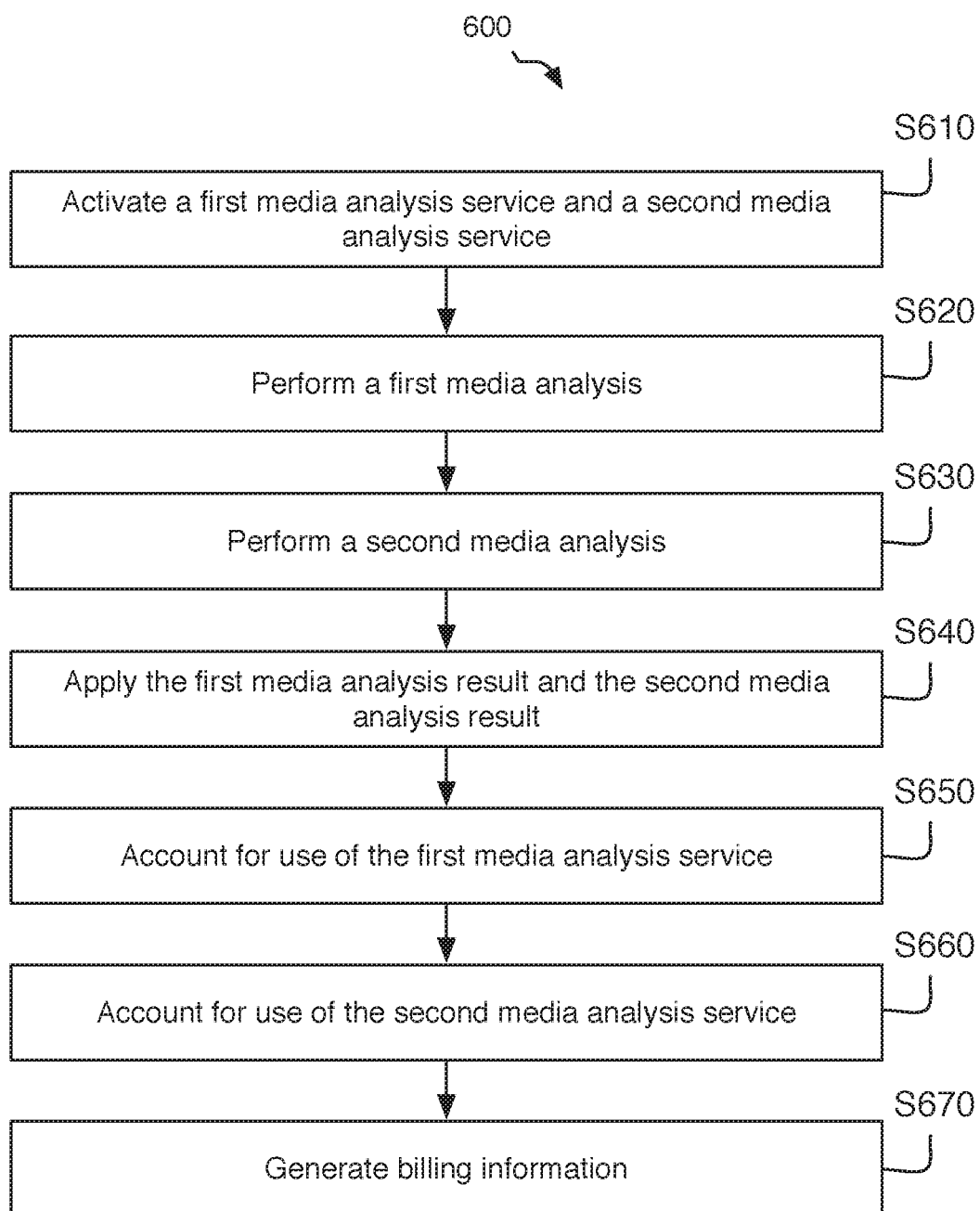
FIG. 6 is a block diagram representation of a method of an embodiment.

As shown in FIG. 6, the method 600 is performed at a multi-tenant media processing platform system (e.g., the system 300 of FIG. 3A) that includes a plurality of media analysis services (e.g., implemented as micro-services 322-323 of FIG. 3A).

In some embodiments, the method 600 is similar to embodiments of the methods 400 and 500 as described herein.

The method 600 includes: activating a first media analysis service (e.g., of 322 of FIG. 3) and a second media analysis service (e.g., of 323 of FIG. 3) of the plurality of media analysis services for at least a portion of an active communication session (e.g., a communication session of the communication micro-service 321) of an entity (e.g., an entity of one of the systems 351-355) in the platform system 300 (process S610); the first activated media analysis service performing a first media analysis on the collected media while the communication session is active to generate a first media analysis result (process S620); the second activated media analysis service performing a second media analysis on the collected media while the communication session is active to generate a second media analysis result, the second media analysis being different from the first media analysis (process S630); during the active communication session, applying the first media analysis result and the second media analysis result (process S640); accounting for the use of the first activated media analysis service on behalf of the entity (process S650); accounting for the use of the second activated media analysis service on behalf of the entity, the platform system accounting for the use of the second activated media analysis service independently from the accounting for the use of the first activated media analysis service (process S660); generating billing information for the entity based on the accounting for the use of the first activated media analysis service and the accounting for the use of the second activated media analysis service (process S670).

The platform system activates each media analysis service responsive to at least one of: a determination by the platform system 300 that at least one property of media of the active communication session that is collected by the platform system maps to at least one setting of entity platform configuration that enables media analysis, the entity platform configuration being platform configuration of the entity in the platform system 300; a communication application instruction (as described herein); a REST API call (as described herein); and a SIP message (as described herein). In some embodiments, the REST API call is provided by an external system of the entity. In some embodiments, the communication application instruction is provided by an external system of the entity. In some embodiments, the SIP message is provided by an external system of the entity.

The platform system applies the first media analysis result and the second media analysis result by at least one of: changing the active communication session in response to at least one of the first media analysis result and the second media analysis result; and transmitting at least one application layer protocol message to at least one callback URI of an external system (e.g., 351-355) of the entity, the at least one callback URI being specified by the entity platform configuration, the at least one application layer protocol message providing at least one of the first media analysis result and the second media analysis result.

The entity platform configuration is provided by at least one external system (e.g., 351-355) via an account management interface (e.g., of the platform API system 383 of FIG. 3) of the media processing platform system 300, the account management interface including a least one of an account portal user interface and an account management API.

The first media analysis service and the second media analysis service are both active during at least a portion of the active communication session.

In some embodiments, the plurality of media analysis services includes at least one of a sentiment and emotion detection service, a transcription service, a language detection service, a content detection service, an intent detection service, a speaker detection service, a context analysis service, a computer vision service, and a natural language processing service.

In some embodiments, the plurality of media analysis services includes at least one of a sentiment and emotion detection service, a context analysis service, and a computer vision service.

In some embodiments, the plurality of media analysis services includes at least one of a sentiment and emotion detection service.

In some embodiments, the plurality of media analysis services includes at least one of a sentiment and emotion detection service, a language detection service, an intent detection service, a speaker detection service, a context analysis service, and a computer vision service.

In some embodiments, the active communication session is a communication session between at least a first communication endpoint device (e.g., the endpoint device 356 of FIG. 3) and a second communication endpoint device (e.g., the endpoint device 357 of FIG. 3), the first communication endpoint device and the second communication endpoint device each being external to the platform system 300, and each media analysis service is constructed to perform media analysis on media of the communication session between at least the first communication endpoint device and the second communication endpoint device.

In some embodiments, the active communication session is a peer-to-peer communication session.

In some embodiments, the active communication session is a real-time communication session.

In some embodiments, the media is a real-time media stream.

In some embodiments, applying the first media analysis result and the second media analysis result includes transmitting at least one application layer protocol message to at least one callback URI of a communication service of the platform system (e.g., a callback URI of the communication micro-service 321, such as, for example, a callback URI corresponding to the communication micro-service API 391) of the entity, the at least one application layer protocol message providing at least one of the first media analysis result and the second media analysis result.

In some implementations, a media analysis micro-service (e.g., 323, 323) performs at least one of the processes S610-S670. In some implementations, the communication micro-service (e.g., 321) performs at least one of the processes S610-S670. In some implementations, the platform API system 383 performs at least one of the processes S610-S670. In some implementations, the operational services 399 performs at least one of the processes S610-S670.

7. Multi-Tenant Media Processing Platform Method 700

Figure 7:
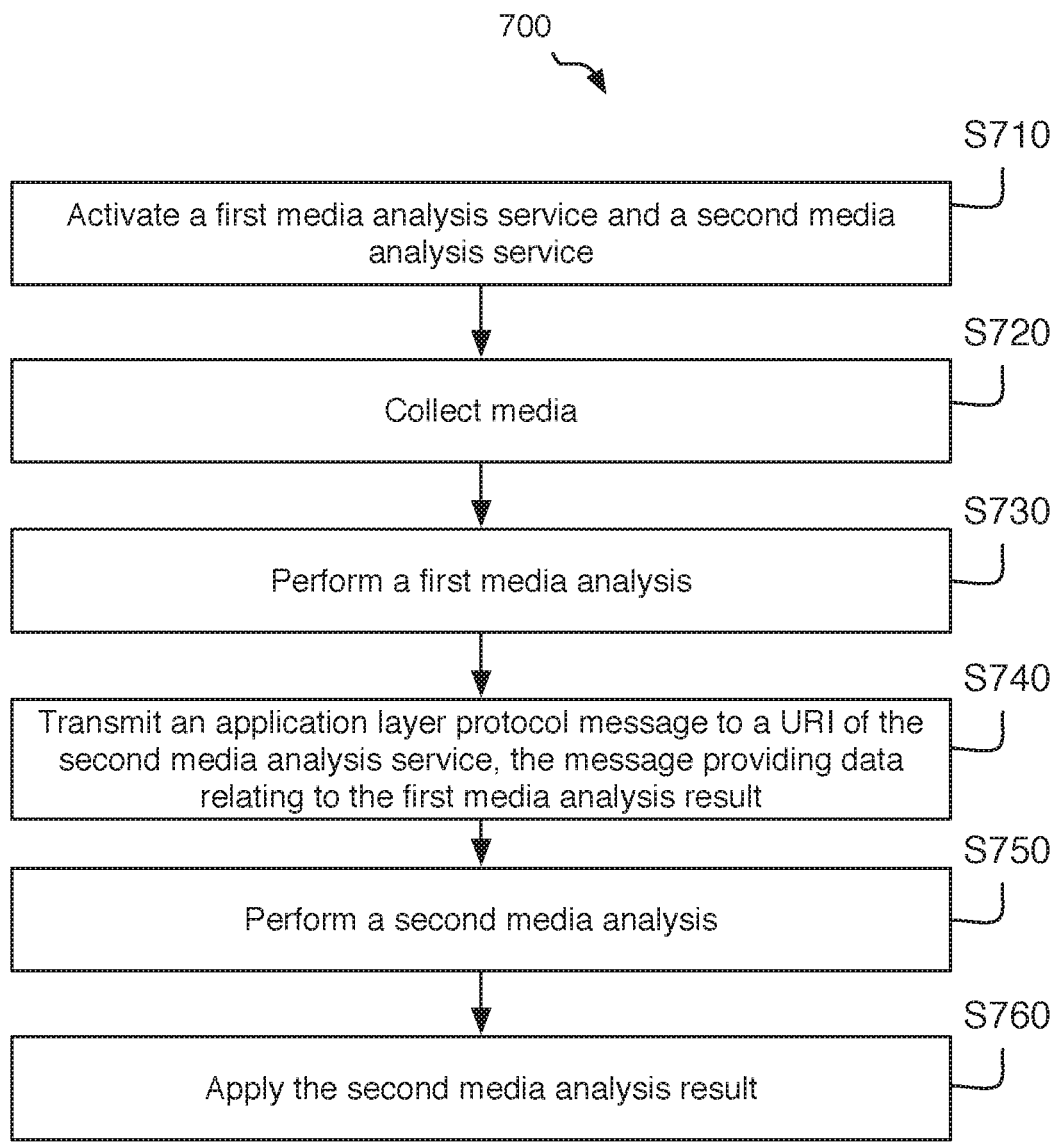
FIG. 7 is a block diagram representation of a method of an embodiment.

As shown in FIG. 7, the method 700 is performed at a multi-tenant media processing platform system (e.g., the system 300 of FIG. 3A) that includes a plurality of media analysis services (e.g., implemented as micro-services 322-323 of FIG. 3A).

In some embodiments, the method 700 is similar to embodiments of the methods 400 and 500 as described herein.

The method 700 includes: activating at least a first media analysis service (e.g., of the micro-service 322 of FIG. 3) and a second media analysis service (e.g., of the micro-service 323 of FIG. 3) of the plurality of media analysis services for at least a portion of an active communication session of an entity (e.g., of a system 351-355) in the platform system (process S710); the first media analysis service collecting media of the active communication session (process S720); the first media analysis service performing a first media analysis on the collected media while the communication session is active to generate a first media analysis result (process S730); the first media analysis service transmitting an application layer protocol message to a Uniform Resource Identifier (URI) of the second media analysis service, the application layer protocol message providing data relating to the first media analysis result (process S740); the second media analysis service performing a second media analysis on the first media analysis result while the communication session is active to generate a second media analysis result, the second media analysis being different from the first media analysis (process S750); during the active communication session, applying the second media analysis result (process S760). A callback URI parameter of the first media analysis service (e.g., stored as entity platform configuration for the entity) is configured to specify the URI of the second media analysis service. The first media analysis service and the second media analysis service are both active during at least a portion of the active communication session.

In some embodiments, the application layer protocol message is an API call in accordance with an API of a media analysis micro-service (e.g., API 392, 393 of FIG. 3) of the second media analysis service.

In some embodiments, applying the second media analysis result includes transmitting at least one application layer protocol message to at least one callback URI of an external system (e.g., 351-355) of the entity, the at least one callback URI being specified by a REST API call provided by the external system of the entity, the at least one application layer protocol message providing the second media analysis result.

In some embodiments, applying the second media analysis result includes transmitting at least one application layer protocol message to at least one callback URI of a communication service of the platform system (e.g., a callback URI of the communication micro-service 321, such as, for example, a callback URI corresponding to the communication micro-service API 391) of the entity, the at least one application layer protocol message providing the second media analysis result.

In some embodiments, the plurality of media analysis services includes at least one of a sentiment and emotion detection service, a transcription service, a language detection service, a content detection service, an intent detection service, a speaker detection service, a context analysis service, a computer vision service, and a natural language processing service.

In some embodiments, the plurality of media analysis services includes at least one of a sentiment and emotion detection service, a context analysis service, and a computer vision service.

In some embodiments, the plurality of media analysis services includes at least one of a sentiment and emotion detection service.

In some embodiments, the plurality of media analysis services includes at least one of a sentiment and emotion detection service, a language detection service, an intent detection service, a speaker detection service, a context analysis service, and a computer vision service.

In some embodiments, the active communication session is a communication session between at least a first communication endpoint device (e.g., the endpoint device 356 of FIG. 3) and a second communication endpoint device (e.g., the endpoint device 357 of FIG. 3), the first communication endpoint device and the second communication endpoint device each being external to the platform system 300, and the first media analysis service is constructed to perform media analysis on media of the communication session between at least the first communication endpoint device and the second communication endpoint device.

In some embodiments, the active communication session is a peer-to-peer communication session.

In some embodiments, the active communication session is a real-time communication session.

In some embodiments, the media is a real-time media stream.

In some implementations, a media analysis micro-service (e.g., 323, 323) performs at least one of the processes S710-S760. In some implementations, the communication micro-service (e.g., 321) performs at least one of the processes S710-S760. In some implementations, the platform API system 383 performs at least one of the processes S710-S760. In some implementations, the operational services 399 performs at least one of the processes S710-S760.

8. System Architecture: Platform System 300

Figure 8:
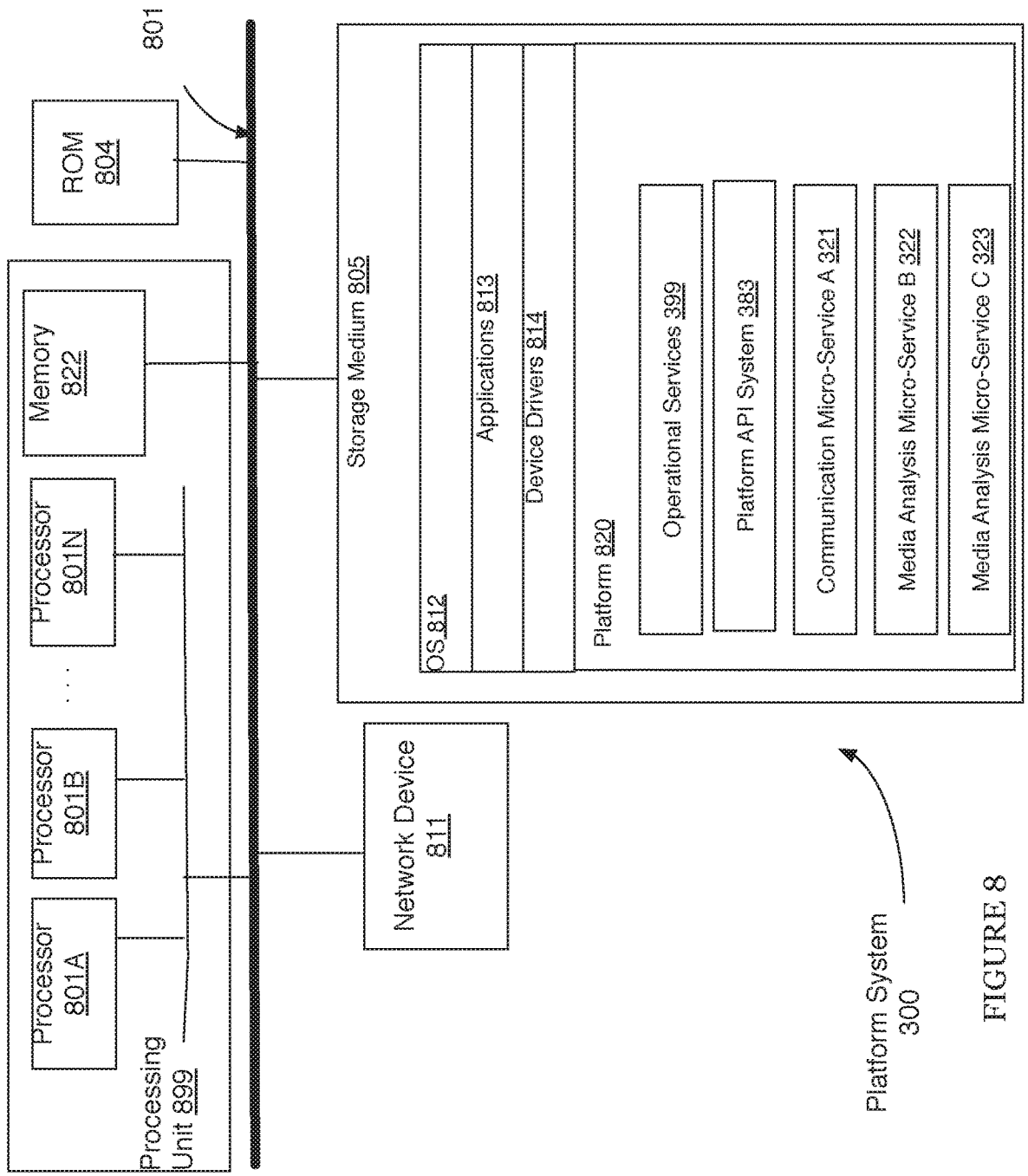
FIG. 8 is an architecture diagram of a system of an embodiment.

FIG. 8 is an architecture diagram of a system (e.g., the platform system 300 of FIG. 3A) according to an implementation in which the system is implemented by a server device. In some implementations, the system is implemented by a plurality of devices. In some implementations, the system 300 is similar to the system 100 of FIG. 1.

The bus 801 interfaces with the processors 801A-801N, the main memory (e.g., a random access memory (RAM)) 822, a read only memory (ROM) 804, a processor-readable storage medium 805, and a network device 811. In some implementations, the system 300 includes at least one of a display device and a user input device.

The processors 801A-801N may take many forms, such as ARM processors, X86 processors, and the like.

In some implementations, the system (e.g., 300) includes at least one of a central processing unit (processor) and a multi-processor unit (MPU).

The processors 801A-801N and the main memory 822 form a processing unit 899. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of the operational services, the platform API system, and one or more micro-services.

The network adapter device 811 provides one or more wired or wireless interfaces for exchanging data and commands between the system (e.g., 300) and other devices, such as an external system (e.g., 351-355). Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 822 (of the processing unit 899) from the processor-readable storage medium 805, the ROM 804 or any other storage location. During execution of these software programs, the respective machine-executable instructions are accessed by at least one of processors 801A-801N (of the processing unit 899) via the bus 801, and then executed by at least one of processors 801A-801N. Data used by the software programs are also stored in the memory 822, and such data is accessed by at least one of processors 801A-801N during execution of the machine-executable instructions of the software programs. The processor-readable storage medium 805 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 805 includes machine-executable instructions (and related data) for an operating system 812, software programs 813, device drivers 814, and the communication platform 820 of the system 300. The machine-executable instructions (and related data) for the communication platform 820 include machine-executable instructions (and related data) for the operational services 399, the platform API System 383, and the micro-services 321-323.

9. System Architecture: External System

Figure 9:
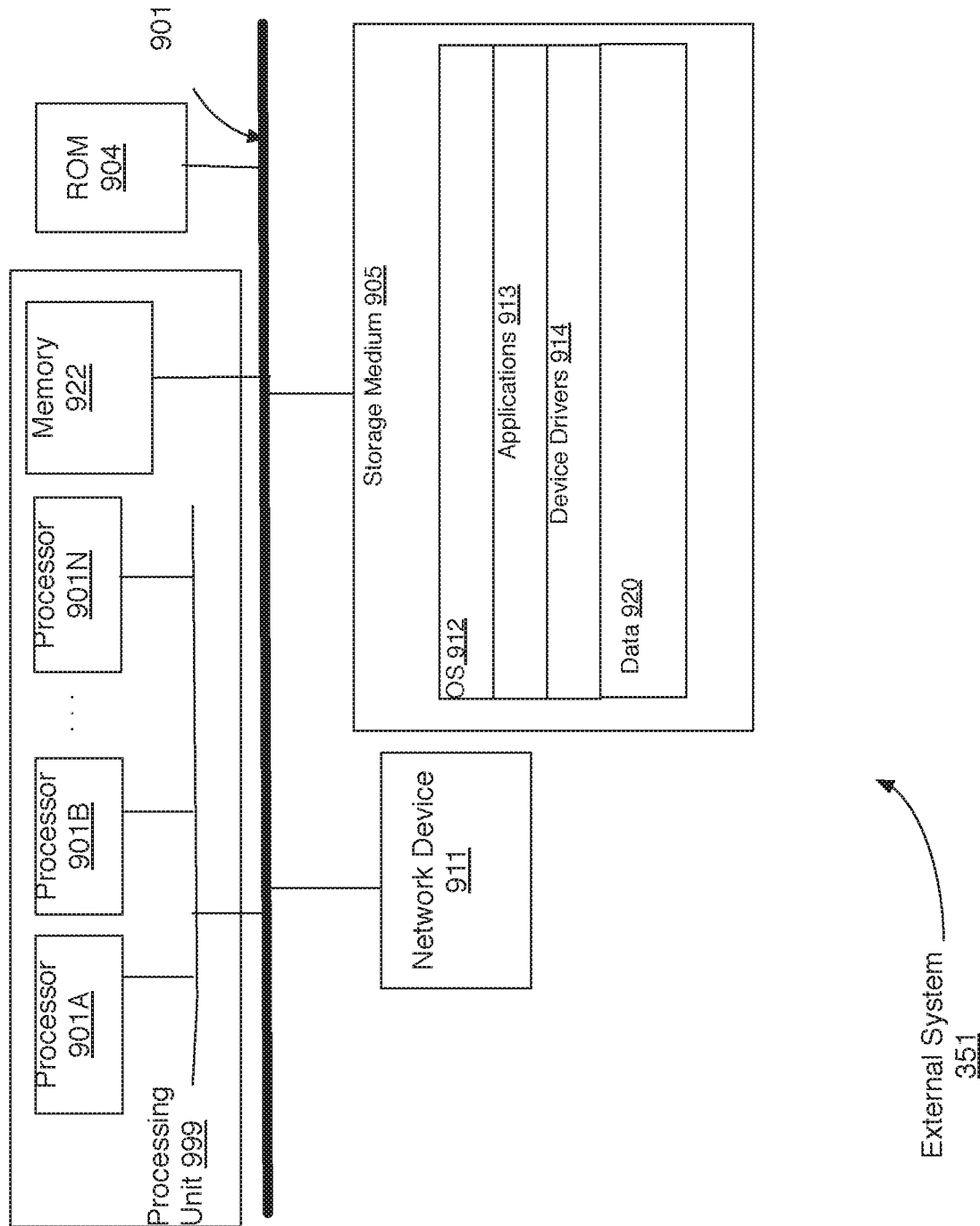
FIG. 9 is an architecture diagram of an external system.

FIG. 9 is an architecture diagram of an external system (e.g., an entity external system, such as, for example, one of the entity systems 351-353 of FIG. 3A) according to an implementation in which the external system is implemented by a server device. In some implementations, the external system is implemented by a plurality of devices.

The bus 901 interfaces with the processors 901A-901N, the main memory (e.g., a random access memory (RAM)) 922, a read only memory (ROM) 904, a processor-readable storage medium 905, and a network device 911. In some implementations, the external system includes a display device and a user input device.

The processors 901A-901N may take many forms, such as ARM processors, X86 processors, and the like.

In some implementations, the server device includes at least one of a central processing unit (processor) and a multi-processor unit (MPU).

The processors 901A-901N and the main memory 922 form a processing unit 999. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

The network adapter device 911 provides one or more wired or wireless interfaces for exchanging data and commands between the external system and other devices, such as the system 300 of FIG. 3A. Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 922 (of the processing unit 999) from the processor-readable storage medium 905, the ROM 904 or any other storage location. During execution of these software programs, the respective machine-executable instructions are accessed by at least one of processors 901A-901N (of the processing unit 999) via the bus 901, and then executed by at least one of processors 901A-901N. Data used by the software programs are also stored in the memory 922, and such data is accessed by at least one of processors 901A-901N during execution of the machine-executable instructions of the software programs. The processor-readable storage medium 905 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 905 includes machine-executable instructions (and related data) for an operating system 912, software programs 913, device drivers 914, and data 920.

10. Machines

The systems and methods of the preferred embodiments and variations thereof can be embodied and/or implemented at least in part as a machine configured to receive a computer-readable medium storing computer-readable instructions. The instructions are preferably executed by computer-executable components preferably integrated with the media intelligence platform. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

11. Conclusion

As a person skilled in the art will recognize from the previous detailed description and from the figures and claims, modifications and changes can be made to the preferred embodiments of the invention without departing from the scope of this invention defined in the following claims.

What is claimed is:
1. A method comprising:
receiving, by a cloud-based communication platform, a command to initiate a media service in relation to a communication session, the command received from an application server that is external to the cloud-based communication platform, the application server and the communication session being associated with an account of the cloud-based communication platform;

in response to receiving the command, generating a result by using the media service to perform an analysis on at least a portion of media transmitted as part of the communication session; and initiating an event based on the result.

2. The method of claim 1, wherein the command is based on an Application Programming Interface (API) for communicating with the cloud-based communication platform.

3. The method of claim 1, wherein initiating the event based on the result comprising:

transmitting the result to an external computing device.

4. The method of claim 3, further comprising:

receiving an API request from the external computing device, the result transmitted to the external computing device in response to the API request.

5. The method of claim 3, wherein the result is transmitted to the external computing device using a resource identifier for the external computing device.

6. The method of claim 1, further comprising:

updating a record associated with the account based on use of the media service to perform the analysis.

7. The method of claim 1, wherein the media service is a sentiment and emotion detection service.

8. The method of claim 1, wherein the media service is an intent detection service.

9. The method of claim 1, further comprising:

training the media service based on the result and user feedback provided by an external system via a feedback API.

10. The method of claim 1, wherein the commination session is an active asynchronous message conversation comprising a time ordered sequence of messages.

11. A cloud-based communication platform comprising:
one or more computer processors; and
one or more computer-readable mediums storing instructions that, when executed by the one or more computer processors, cause the cloud-based communication platform to perform operations comprising:
receiving a command to initiate a media service in relation to a communication session, the command received from an application server that is external to the cloud-based communication platform, the application server and the communication session being associated with an account of the cloud-based communication platform;
in response to receiving the command, generating a result by using the media service to perform an analysis on at least a portion of media transmitted as part of the communication session; and
initiating an event based on the result.

12. The cloud-based communication platform of claim 11, wherein the command is based on an Application Programming Interface (API) for communicating with the cloud-based communication platform.

13. The cloud-based communication platform of claim 11, wherein initiating the event based on the result comprising:

transmitting the result to an external computing device.

14. The cloud-based communication platform of claim 13, the operations further comprising:

receiving an API request from the external computing device, the result transmitted to the external computing device in response to the API request.

15. The cloud-based communication platform of claim 13, wherein the result is transmitted to the external computing device using a resource identifier for the external computing device.

16. The cloud-based communication platform of claim 11, the operations further comprising:

updating a record associated with the account based on use of the media service to perform the analysis.

17. The cloud-based communication platform of claim 11, wherein the media service is a sentiment and emotion detection service.

18. The cloud-based communication platform of claim 11, wherein the media service is an intent detection service.

19. The cloud-based communication platform of claim 11, the operations further comprising:

training the media service based on the result and user feedback provided by an external system via a feedback API.

20. A non-transitory computer-readable medium storing instructions that, when executed by one or more computer processors of a cloud-based communication platform, cause the cloud-based communication platform to perform operations comprising:
receiving a command to initiate a media service in relation to a communication session, the command received from an application server that is external to the cloud-based communication platform, the application server and the communication session being associated with an account of the cloud-based communication platform;
in response to receiving the command, generating a result by using the media service to perform an analysis on at least a portion of media transmitted as part of the communication session; and
initiating an event based on the result.

* * * * *